United States Patent
Takayama et al.

(10) Patent No.: US 6,606,703 B2
(45) Date of Patent: Aug. 12, 2003

(54) PROCESSOR USING LESS HARDWARE AND INSTRUCTION CONVERSION APPARATUS REDUCING THE NUMBER OF TYPES OF INSTRUCTIONS

(75) Inventors: Shuichi Takayama, Takarazuka (JP); Kensuke Odani, Kyoto (JP); Akira Tanaka, Yawata (JP); Nobuo Higaki, Osaka (JP); Masato Suzuki, Toyonaka (JP); Tetsuya Tanaka, Ibaraki (JP); Taketo Heishi, Osaka (JP); Shinya Miyaji, Hirakata (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 149 days.

(21) Appl. No.: 09/756,068

(22) Filed: Jan. 8, 2001

(65) Prior Publication Data

US 2001/0001154 A1 May 10, 2001

Related U.S. Application Data

(62) Division of application No. 09/144,298, filed on Aug. 31, 1998, now Pat. No. 6,230,258.

(30) Foreign Application Priority Data

Aug. 29, 1997 (JP) .............................................. 9-234354
Apr. 8, 1998 (JP) .............................................. 10-95645

(51) Int. Cl.$^7$ .............................................. G06F 15/00
(52) U.S. Cl. .............................. 712/226; 716/2; 716/1; 712/214
(58) Field of Search ........................... 716/1, 2, 12, 13; 712/234, 235, 213, 54, 226, 225, 212, 214

(56) References Cited

U.S. PATENT DOCUMENTS

| 4,654,785 A | | 3/1987 | Nishiyama et al. |
| 5,165,033 A | | 11/1992 | Kawasaki et al. |
| 5,396,603 A | * | 3/1995 | Tamaki et al. ............... 712/216 |

(List continued on next page.)

FOREIGN PATENT DOCUMENTS

GB  2308470  6/1997

OTHER PUBLICATIONS

"A Comparison of Full and Partial Predicated Execution Support for LLP Processors" by S. Mahlke et al. Proceedings of the Annual Symposium on Computer Architecture, Jun. 22, 1995.

(List continued on next page.)

*Primary Examiner*—Vuthe Siek
*Assistant Examiner*—Binh C. Tat

(57) ABSTRACT

Processor and instruction conversion apparatus, including a technique for reducing the number of types of instructions and processor hardware scale when conditional instructions are used. The processor includes a stare hold unit, an obtaining unit, a decoding unit, a judging unit, and an execution unit. The judging unit judges whether a state hold unit renewal state is included in either of the state and the plurality of states specified by the first state condition in the first conditional instruction when decoded by the decoding unit. When the judgment is affirmative, the execution unit executes an operation specified by the operation code in the first conditional instruction decoded by the decoding unit. The instruction set is assigned first conditional instructions with a first state condition which is mutually exclusive with a second state condition for an unassigned second conditional instruction, both having the same operation code.

14 Claims, 23 Drawing Sheets

U.S. PATENT DOCUMENTS

| | | | |
|---|---|---|---|
| 5,418,917 A | | 5/1995 | Hiraoka et al. |
| 5,426,742 A | | 6/1995 | Kawasaki et al. |
| 5,471,593 A | | 11/1995 | Branigin |
| 5,539,888 A | * | 7/1996 | Byers et al. ............... 712/234 |
| 5,860,152 A | | 1/1999 | Savkar |
| 5,951,678 A | | 9/1999 | Moyer |
| 6,075,935 A | * | 6/2000 | Ussery et al. ............... 716/12 |
| 6,105,124 A | | 8/2000 | Farber et al. |
| 6,202,198 B1 | * | 3/2001 | Bibyk ....................... 341/143 |
| 6,226,716 B1 | * | 5/2001 | Bauman et al. ............. 703/13 |
| 6,353,880 B1 | * | 3/2002 | Cheng ....................... 712/200 |

OTHER PUBLICATIONS

"Parallelization of Loops with Exits on Pipelined Architectures," by P. Tirumalai et al. Proceedings of the Supercomputer Conference, Nov. 12, 1990.

"Analysis Techniques for Predicated Code" by R. Johnson et al., Proceedings of the Annual IEEE/ACM Int'l Symposium on Microarchitecture, Dec. 2, 1996.

"Conditional Annulling for Superscala Processors" by C.H. Wen et al., Proceedings of the Region Ten Conference (TENCON), Oct. 13, 1993.

* cited by examiner

Fig. 2

| CONDITIONAL TRANSFER INSTRUCTION 201 | | CONDITION 202 |
|---|---|---|
| moveq | ← 203 | = |
| movgt | ← 204 | > |
| movge | ← 205 | ≧ |

Fig. 4A

```
if(a == b)
{
        c = 1;
}
else
{
        c = 0;
}
f();
```

Fig. 4B

```
if(a != b)
{
        c = 1;
}
else
{
        c = 0;
}
f();
```

Fig. 5A

```
           a cmp b      ←501
           beq Lt       ←502
507        c = 0        ←503
 ↓         jmp L        ←504
Lt:        c = 1        ←505
L:         jsr  f       ←506
 ↑
508
```

Fig. 5B

```
           a cmp b      ←511
           bne Lt       ←512
517        c = 0        ←513
 ↓         jmp L        ←514
Lt:        c = 1        ←515
L:         jsr  f       ←516
 ↑
518
```

Fig. 6A

```
a cmp b        ←601
c = 0          ←602
c =:eq 1       ←603
jsr  f         ←604
```

Fig. 6B

```
a cmp b        ←611
c = 1          ←612
c =:eq 0       ←613
jsr  f         ←614
```

Fig. 7A

```
cmp      r0,r1      ←701
mov      0,r2       ←702
moveq    1,r2       ←703
jsr      f          ←704
```

Fig. 7B

```
cmp      r0,r1      ←711
mov      1,r2       ←712
moveq    0,r2       ←713
jsr      f          ←714
```

Fig. 9 a cmp b     ←901
c = 0       ←902
c = :ne 1   ←903
jsr  f      ←904

Fig. 10

| CONDITIONAL BRANCH INSTRUCTION 1001 | | CONDITION 1002 |
|---|---|---|
| beq | ←1003 | = |
| bgt | ←1004 | > |
| bge | ←1005 | ≥ |

Fig. 12

```
            a cmp b     ←1201
            beq Lt      ←1202
1207        c = 1       ←1203
 ↓          jmp L       ←1204
Lt:         c = 0       ←1205
L:          jsr  f      ←1206
↑
1208
```

Fig. 13

```
            cmp    r0,r1    ←1301
            beq    Lt       ←1302
1307        mov    1,r2     ←1303
 ↓          jmp    L        ←1304
Lt:         mov    0,r2     ←1305
L:          jsr    f        ←1306
↑
1308
```

Fig. 14

| INSTRUCTION IN MNEMONIC CODE [COMPARISON] | SPECIFIED CONDITION | OPERATION |
|---|---|---|
| cmpeq Rm,Rn | = | SET CODITIONAL FLAG WHEN RESULT OF CMP INSTRUCTION INDICATE Rm AND Rn ARE EQUAL, OTHERWISE RESET CONDITIONAL FLAG |
| cmpne Rm,Rn | ≠ | SET CODITIONAL FLAG WHEN RESULT OF CMP INSTRUCTION INDICATE Rm AND Rn ARE NOT EQUAL, OTHERWISE RESET CONDITIONAL FLAG |
| cmpge Rm,Rn | ≧ | SET CODITIONAL FLAG WHEN RESULT OF CMP INSTRUCTION INDICATE Rm IS GREATER THAN OR EQUAL TO Rn AS DATA WITH SIGNS, OTHERWISE RESET CONDITIONAL FLAG |
| cmple Rm,Rn | ≦ | SET CODITIONAL FLAG WHEN RESULT OF CMP INSTRUCTION INDICATE Rm IS SMALLER THAN OR EQUAL TO Rn AS DATA WITH SIGNS, OTHERWISE RESET CONDITIONAL FLAG |
| cmpgt Rm,Rn | > | SET CODITIONAL FLAG WHEN RESULT OF CMP INSTRUCTION INDICATE Rm IS GREATER THAN Rn AS DATA WITH SIGNS, OTHERWISE RESET CONDITIONAL FLAG |
| cmplt Rm,Rn | < | SET CODITIONAL FLAG WHEN RESULT OF CMP INSTRUCTION INDICATE Rm IS SMALLER THAN Rn AS DATA WITH SIGNS, OTHERWISE RESET CONDITIONAL FLAG |
| cmpns Rm,Rn | ≧ | SET CODITIONAL FLAG WHEN RESULT OF CMP INSTRUCTION INDICATE Rm IS GREATER THAN OR EQUAL TO Rn AS DATA WITHOUT SIGNS, OTHERWISE RESET CONDITIONAL FLAG |
| cmpls Rm,Rn | ≦ | SET CODITIONAL FLAG WHEN RESULT OF CMP INSTRUCTION INDICATE Rm IS SMALLER THAN OR EQUAL TO Rn AS DATA WITHOUT SIGNS, OTHERWISE RESET CONDITIONAL FLAG |
| cmphi Rm,Rn | > | SET CODITIONAL FLAG WHEN RESULT OF CMP INSTRUCTION INDICATE Rm IS GREATER THAN Rn AS DATA WITHOUT SIGNS, OTHERWISE RESET CONDITIONAL FLAG |
| cmplo Rm,Rn | < | SET CODITIONAL FLAG WHEN RESULT OF CMP INSTRUCTION INDICATE Rm IS SMALLER THAN Rn AS DATA WITHOUT SIGNS, OTHERWISE RESET CONDITIONAL FLAG |
| bt label | — | BRANCH WHEN CONDITIONAL FLAG IS SET |
| movt Rm,Rn | — | TRANSFER Rm TO Rn WHEN CONDITIONAL FLAG IS SET |
| addt Rm,Rn,Rd | — | ADD Rm AND Rn AND STORE ADDITION RESULT IN Rd WHEN CONDITIONAL FLAG IS SET |

Fig. 16

```
if(a == b)
{
        c = 1;
}
else
{
        c = 0;
}
f();
```

Fig. 17

```
        a cmp b
        beq Lt
        c=0
        jmp L
Lt:     c=1
L:      jsr f
```

Fig. 18

| | |
|---|---|
| a cmpeq b | ←1801 |
| c=0 | ←1802 |
| c=:true 1 | ←1803 |
| jsr f | ←1804 |

Fig. 19

| | | |
|---|---|---|
| cmpeq | r0,r1 | ←1901 |
| mov | 0,r2 | ←1902 |
| movt | 1,r2 | ←1903 |
| jsr | f | ←1904 |

Fig. 21 a cmp b
c=0
c=:eq 1
jsr   f

Fig. 23 a cmp b  ←2301
c=:ne 0  ←2302
c=:eq 1  ←2303
jsr  f   ←2304

Fig. 25

| CONDITIONAL OPERATION INSTRUCTION | | CONDITION ←2502 |
|---|---|---|
| | ←2501 | |
| addeq | ←2503 | = |
| addgt | ←2504 | > |
| addge | ←2505 | ≥ |

Fig. 26

```
if(a != b)
{
        d = c + 1;
}
else
{
        d = c + 2;
}
f ();
```

Fig. 27

```
        a cmp b
        bne Lt
        d = c + 2
        jmp L
Lt:     d = c + 1
L:      jsr  f
```

Fig. 28

```
a cmp b
d = c + 1
d = c +:eq 2
jsr  f
```

Fig. 29

```
cmp      r0,r1
add      1,r2,r3
addeq    2,r2,r3
```

Fig. 30

| | | |
|---|---|---|
| mov | 1,r0 | ←3001 |
| cmp | r1,r2 | ←3002 |
| moveq | 0,r0 | ←3003 |

Fig. 31

| CONDITIONAL TRANSFER INSTRUCTION 3101 | CONDITION 3102 |
|---|---|
| moveq | = |
| movne | ≠ |
| movgt | > |
| movge | ≥ |
| movlt | < |
| movle | ≤ |

Fig. 32

| INSTRUCTION IN MNEMONIC CODE | SPECIFIED CONDITION | OPERATION |
|---|---|---|
| [COMPARISON] | | |
| cmp Ra,Rb | | COMPARE Ra AND Rb AND SET OPERATION FLAG TO INDICATE COMPARISON RESULT |
| [CONDITIONAL ADDITION] | | |
| addeq Rd,Rn,Rm | = | ADD Rm AND Rn AND STORE ADDITION RESULT IN Rd WHEN RESULT OF CMP INSTRUCTION INDICATE Ra AND Rb ARE EQUAL |
| addne Rd,Rn,Rm | ≠ | ADD Rm AND Rn AND STORE ADDITION RESULT IN Rd WHEN RESULT OF CMP INSTRUCTION INDICATE Ra AND Rb ARE NOT EQUAL |
| addge Rd,Rn,Rm | ≥ | ADD Rm AND Rn AND STORE ADDITION RESULT IN Rd WHEN RESULT OF CMP INSTRUCTION INDICATE Ra IS GREATER THAN OR EQUAL TO Rb AS DATA WITH SIGNS |
| addle Rd,Rn,Rm | ≤ | ADD Rm AND Rn AND STORE ADDITION RESULT IN Rd WHEN RESULT OF CMP INSTRUCTION INDICATE Ra IS SMALLER THAN OR EQUAL TO Rb AS DATA WITH SIGNS |
| addgt Rd,Rn,Rm | > | ADD Rm AND Rn AND STORE ADDITION RESULT IN Rd WHEN RESULT OF CMP INSTRUCTION INDICATE Ra IS GREATER THAN Rb AS DATA WITH SIGNS |
| addlt Rd,Rn,Rm | < | ADD Rm AND Rn AND STORE ADDITION RESULT IN Rd WHEN RESULT OF CMP INSTRUCTION INDICATE Ra IS SMALLER THAN Rb AS DATA WITH SIGNS |
| addhs Rd,Rn,Rm | ≥ | ADD Rm AND Rn AND STORE ADDITION RESULT IN Rd WHEN RESULT OF CMP INSTRUCTION INDICATE Ra IS GREATER THAN OR EQUAL TO Rb AS DATA WITHOUT SIGNS |
| addls Rd,Rn,Rm | ≤ | ADD Rm AND Rn AND STORE ADDITION RESULT IN Rd WHEN RESULT OF CMP INSTRUCTION INDICATE Ra IS SMALLER THAN OR EQUAL TO Rb AS DATA WITHOUT SIGNS |
| addhi Rd,Rn,Rm | > | ADD Rm AND Rn AND STORE ADDITION RESULT IN Rd WHEN RESULT OF CMP INSTRUCTION INDICATE Ra IS GREATER THAN Rb AS DATA WITHOUT SIGNS |
| addlo Rd,Rn,Rm | < | ADD Rm AND Rn AND STORE ADDITION RESULT IN Rd WHEN RESULT OF CMP INSTRUCTION INDICATE Ra IS SMALLER THAN Rb AS DATA WITHOUT SIGNS |
| [CONDITIONAL TRANSFER] | | |
| moveq Rd,Rm | = | TRANSFER Rm TO Rd WHEN RESULT OF CMP INSTRUCTION INDICATE Ra AND Rb ARE EQUAL |
| movne Rd,Rm | ≠ | TRANSFER Rm TO Rd WHEN RESULT OF CMP INSTRUCTION INDICATE Ra AND Rb ARE NOT EQUAL |
| movge Rd,Rm | ≥ | TRANSFER Rm TO Rd WHEN RESULT OF CMP INSTRUCTION INDICATE Ra IS GREATER THAN OR EQUAL TO Rb AS DATA WITH SIGNS |
| movle Rd,Rm | ≤ | TRANSFER Rm TO Rd WHEN RESULT OF CMP INSTRUCTION INDICATE Ra IS SMALLER THAN OR EQUAL TO Rb AS DATA WITH SIGNS |
| movgt Rd,Rm | > | TRANSFER Rm TO Rd WHEN RESULT OF CMP INSTRUCTION INDICATE Ra IS GREATER THAN Rb AS DATA WITH SIGNS |
| movlt Rd,Rm | < | TRANSFER Rm TO Rd WHEN RESULT OF CMP INSTRUCTION INDICATE Ra IS SMALLER THAN Rb AS DATA WITH SIGNS |
| movhs Rd,Rm | ≥ | TRANSFER Rm TO Rd WHEN RESULT OF CMP INSTRUCTION INDICATE Ra IS GREATER THAN OR EQUAL TO Rb AS DATA WITHOUT SIGNS |
| movls Rd,Rm | ≤ | TRANSFER Rm TO Rd WHEN RESULT OF CMP INSTRUCTION INDICATE Ra IS SMALLER THAN OR EQUAL TO Rb AS DATA WITHOUT SIGNS |
| movhi Rd,Rm | > | TRANSFER Rm TO Rd WHEN RESULT OF CMP INSTRUCTION INDICATE Ra IS GREATER THAN Rb AS DATA WITHOUT SIGNS |
| movlo Rd,Rm | < | TRANSFER Rm TO Rd WHEN RESULT OF CMP INSTRUCTION INDICATE Ra IS SMALLER THAN Rb AS DATA WITHOUT SIGNS |
| [CONDITIONAL BRANCH] | | |
| beq label | = | BRANCH TO label WHEN RESULT OF CMP INSTRUCTION INDICATE Ra AND Rb ARE EQUAL |
| bne label | ≠ | BRANCH TO label WHEN RESULT OF CMP INSTRUCTION INDICATE Ra AND Rb ARE NOT EQUAL |
| bge label | ≥ | BRANCH TO label WHEN RESULT OF CMP INSTRUCTION INDICATE Ra IS GREATER THAN OR EQUAL TO Rb AS DATA WITH SIGNS |
| ble label | ≤ | BRANCH TO label WHEN RESULT OF CMP INSTRUCTION INDICATE Ra IS SMALLER THAN OR EQUAL TO Rb AS DATA WITH SIGNS |
| bgt label | > | BRANCH TO label WHEN RESULT OF CMP INSTRUCTION INDICATE Ra IS GREATER THAN RN AS DATA WITH SIGNS |
| blt label | < | BRANCH TO label WHEN RESULT OF CMP INSTRUCTION INDICATE Ra IS SMALLER THAN RN AS DATA WITH SIGNS |
| bhs label | ≥ | BRANCH TO label WHEN RESULT OF CMP INSTRUCTION INDICATE Ra IS GREATER THAN OR EQUAL TO Rb AS DATA WITHOUT SIGNS |
| bls label | ≤ | BRANCH TO label WHEN RESULT OF CMP INSTRUCTION INDICATE Ra IS SMALLER THAN OR EQUAL TO Rb AS DATA WITHOUT DATA |
| bhi label | > | BRANCH TO label WHEN RESULT OF CMP INSTRUCTION INDICATE Ra IS GREATER THAN Rb AS DATA WITHOUT SIGNS |
| blo label | < | BRANCH TO label WHEN RESULT OF CMP INSTRUCTION INDICATE Ra IS SMALLER THAN Rb AS DATA WITHOUT SIGNS |

Fig. 33

| INSTRUCTION IN MNEMONIC CODE | SPECIFIED CONDITION | OPERATION |
|---|---|---|
| [COMPARISON] | | |
| cmp/eq Rm,Rn | = | SET CONDITIONAL FLAG WHEN RESULT OF CMP INSTRUCTION INDICATE Rm AND Rn ARE EQUAL, OTHERWISE RESET CONDITIONAL FLAG |
| cmp/ge Rm,Rn | ≥ | SET CONDITIONAL FLAG WHEN RESULT OF CMP INSTRUCTION INDICATE Rm IS GREATER THAN OR EQUAL TO Rn AS DATA WITH SIGNS, OTHERWISE RESET CONDITIONAL FLAG |
| cmp/gt Rm,Rn | > | SET CONDITIONAL FLAG WHEN RESULT OF CMP INSTRUCTION INDICATE Rm IS GREATER THAN Rn AS DATA WITH SIGNS, OTHERWISE RESET CONDITIONAL FLAG |
| cmp/hs Rm,Rn | ≥ | SET CONDITIONAL FLAG WHEN RESULT OF CMP INSTRUCTION INDICATE Rm IS GREATER THAN OR EQUAL TO Rn AS DATA WITHOUT SIGNS, OTHERWISE RESET CONDITIONAL FLAG |
| cmp/hi Rm,Rn | > | SET CONDITIONAL FLAG WHEN RESULT OF CMP INSTRUCTION INDICATE Rm IS GREATER THAN Rn AS DATA WITHOUT SIGNS, OTHERWISE RESET CONDITIONAL FLAG |
| [CONDITIONAL ADDITION] | | |
| addt Rd,Rn,Rm | — | ADD Rm AND Rn AND STORE ADDITION RESULT IN Rd WHEN CONDITIONAL FLAG IS SET |
| addf Rd,Rn,Rm | — | ADD Rm AND Rn AND STORE ADDITION RESULT IN Rd WHEN CONDITIONAL FLAG IS RESET |
| [CONDITIONAL TRANSFER] | | |
| movt Rd,Rm | — | TRANSFER Rm TO Rd WHEN CONDITIONAL FLAG IS SET |
| movf Rd,Rm | — | TRANSFER Rm TO Rd WHEN CONDITIONAL FLAG IS RESET |
| [CONDITIONAL BRANCH] | | |
| bt label | — | BRANCH WHEN CONDITIONAL FLAG IS SET |
| bf label | — | BRANCH WHEN CONDITIONAL FLAG IS RESET |

PROCESSOR USING LESS HARDWARE AND INSTRUCTION CONVERSION APPARATUS REDUCING THE NUMBER OF TYPES OF INSTRUCTIONS

This is a divisional application of U.S. Ser. No. 09/144,298 filed on Aug. 31, 1998, now U.S. Pat. No. 6,230,258.

This application is based on applications Nos. H9-234354 and H10-095645 filed in Japan, the content of which is hereby incorporated by reference.

BACKGROUND OF THE INVENTION

1. Field of the Invention

The present invention relates to a processor and an instruction conversion apparatus, and in particular to a technique for reducing the number of types of instructions and the processor hardware scale when conditional instructions are used.

2. Related Art

In recent years, improvements in performance and processing speed of appliances using embedded microprocessors have led to an in creasing demand for microprocessors (hereinafter simply referred to as "processors") with high processing capability.

A basic technique for increasing processing speed is a pipeline processing.

In the pipeline processing, the processing of each instruction is divided into a plurality of processing units (pipeline stages) and pipeline stages for different instructions are executed in parallel so that processing speed is improved.

The pipeline processing is disturbed, however, (pipeline stalls occur) when executing a branch, reducing the execution performance of the pipelines to below an ideal level. This phenomenon is called a "branch hazard".

Recent processors use conditional instructions instead of branch instructions to reduce branch hazards to improve their processing capabilities. The conditional instructions are, for instance, described in detail in "The ARM RISC Chip-A Programmer's Guide", Addison-Wesly Publishing Company Inc.

FIG. 30 shows an instruction sequence including a conventional conditional transfer instruction. In FIG. 30, each of the legends "r0", "r1", and "r2" represents a register. The instruction 3001 is a transfer instruction for transferring the value "1" to the register "r0". The instruction 3002 is a comparison instruction for comparing the values of the registers "r1" and "r2" and setting various flags to indicate the comparison result. The instruction 3003 is a conditional transfer instruction for referring to the flags and, when the values compared by the instruction 3002 are equal, transferring the value "0" to the register "r0".

FIG. 31 shows a list of conventional conditional transfer instructions 3101. This list includes six types of conditional transfer instructions 3101. The condition 3102 is a sign indicating a condition specified by each conditional transfer instruction. When the operation objects "a" and "b" are compared by a comparison instruction, the condition is one of the following cases: "a" and "b" are equal; "a" and "b" are not equal; "a" is greater than "b"; "a" is greater than or equal to "b"; "a" is smaller than "b"; and "a" is smaller than or equal to "b". Each conditional transfer instruction is executed when its condition is satisfied.

FIG. 32 shows conventional instructions, such as comparison instructions (CMP instructions), conditional addition instructions for performing addition when their conditions are satisfied, conditional transfer instructions for performing transfer when their conditions are satisfied, and conditional branch instructions for performing branch when their conditions are satisfied. In these instructions, last two characters of the operation code of each instruction in mnemonic code specify the condition.

The number of types of conditions of each conditional instruction and each conditional branch instruction shown in FIG. 32 is ten because the conditions shown in FIG. 32 include conditions for data with signs, in addition to the conditions shown in FIG. 31.

Accordingly, the total number of types of instructions including a comparison instruction, conditional instructions for each of two operations (conditional transfer instructions and conditional addition instructions), and conditional branch instructions is thirty-one. Here, if there are A operations of conditional instructions, the total number is represented as 11+(10×A).

There are also conditional instructions whose number of types is reduced. These conditional instructions are described in detail in "Hitachi Single Chip RISC Microcomputer SH7000/SH7600 Series Programming Manual", Hitachi, Ltd., p57–p58, p69–p70, and p75–p78.

FIG. 33 shows comparison instructions, conditional addition instructions, and conditional branch instructions where the number of instruction types is reduced.

Here, the conditional instructions and the conditional branch instructions shown in FIG. 33 use only two types of conditions, that is, a conditional flag is set or is reset. Therefore, FIG. 33 shows two types of conditional addition instructions, two types of conditional transfer instructions, two types of conditional branch instructions, and five types of comparison instructions for setting or resetting the conditional flag.

Accordingly, the total number of types of instructions including comparison instructions, conditional instructions for each of two operations, and conditional branch instructions is eleven. Here, if there are A types of operations of conditional instructions, the total number of types of instructions including comparison instructions, conditional instructions for each operation, and conditional branch instructions is represented as 7+(2×A).

Processors performing pipeline processing need to use more types of conditional instructions to reduce branch hazards as much as possible.

However, because each instruction executed by a processor has a fixed-length bit pattern, the number of types of instructions which the processor can use is limited.

Accordingly, the number of types of conditional instructions which the processor can use is limited. As the number of types of instructions increases, more hardware is required to decode instructions, increasing the cost of the processor.

SUMMARY OF THE INVENTION

In view of the stated problems, the object of the present invention is to provide an instruction conversion apparatus which reduces the number of types of instructions and a processor whose hardware scale is reduced, when conditional instructions are used.

To achieve the above object, the processor of the present invention which decodes and executes an instruction sequence includes: a state hold unit for holding, when a predetermined instruction is executed, a renewal state for an execution result of the predetermined instruction; an obtaining unit for obtaining an instruction sequence composed of instructions matching instructions assigned to an instruction set of the processor, where the instruction set is assigned first conditional instructions, a first state condition for a first conditional instruction being mutually exclusive with a second state condition for a second conditional instruction which has a same operation code as the first conditional instruction, the instruction set not being assigned the second conditional instruction, and the first state condition and the second state condition specifying either of one state and a plurality of states; a decoding unit for decoding each instruction in the obtained instruction sequence one by one; a judging unit for judging whether the renewal state is included in either of the state and the plurality of states specified by the first state condition in the first conditional instruction, when the decoding unit decodes the first conditional instruction; and an execution unit for executing, only if a judgement result by the judging unit is affirmative, an operation specified by the operation code in the first conditional instruction decoded by the decoding unit.

With the stated construction, the processor of the present invention uses an instruction set including only conditional instructions specifying one out of a pair of exclusive conditions, not including conditional instructions specifying the other of the pair. Therefore, the number of types of conditional instructions is reduced, in comparison with a conventional processor.

Accordingly, hardware scale of an instruction decoder can be reduced. Also, when the number of types of instructions is limited, the processor of the present invention can be provided with conditional instructions of more operations. As a result, when the processor of the present invention performs pipeline processing, branch hazards can be reduced.

Here, the renewal state may show a relation between magnitudes of two comparison objects a and b, the relation corresponding to an execution result of a type of comparison instruction, where execution of a first conditional instruction is only possible after a comparison instruction, and the instruction set is assigned three types of first conditional instructions, the first condition states of the three types of first conditional instructions being: 1. one out of "a=b" and "a≠b"; 2. one out of "a≧b" and "a<b"; and 3. one out of "a≦b" and "a>b".

With the stated construction, the processor of the present invention uses three types of conditional instructions for each operation, so that the number of types of conditional instructions can be reduced by half of that of a conventional processor.

Therefore, hardware scale of an instruction decoder can be reduced. Also, when the number of types of instructions is limited, the number of types of conditional instructions can be increased by twice of that of a conventional processor. Therefore, when the processor of the present invention performs pipeline processing, branch hazards can be reduced.

Here, an operation code included in a conditional instruction may be one of a transfer operation code, an arithmetic operation code, and a logic operation code.

With the stated construction, the operation of each conditional instruction included in the instruction set of the processor of the present invention is a transfer operation, an arithmetic operation, and a logic operation.

Therefore, the processor of the present invention can use conditional transfer instructions, conditional arithmetic instructions, and conditional logic instructions. Accordingly, when the processor of the present invention performs pipeline processing, branch hazards can be reduced.

To achieve the above object, the processor of the present invention which decodes and executes an instruction sequence includes: an obtaining unit for obtaining an instruction sequence composed of instructions matching instructions assigned to an instruction set of the processor, where the instruction set is assigned at least one first conditional flag setting instruction, at least one second conditional flag setting instruction, and at least one conditional execution instruction, each first conditional flag setting instruction including a first condition, and each second conditional flag setting instruction including a second condition, each first condition being mutually exclusive with one of the second conditions, each conditional execution instruction including an operation code that is not included in any other conditional execution instruction in the instruction set; a decoding unit for decoding each instruction in the obtained instruction sequence one by one; a conditional flag for holding a judgement result as to whether a predetermined condition is satisfied; a judging unit for judging, when the decoding unit decodes the first conditional flag setting instruction, whether the first condition in the first conditional flag setting instruction is satisfied and has the conditional flag hold a judgement result for the first condition and, when the decoding unit decodes the second conditional flag setting instruction, judges whether the second condition in the second conditional flag setting instruction is satisfied and has the conditional flag hold a judgement result for the second condition; and an execution unit for executing, only if the decoding unit decodes the conditional execution instruction and the judgement result held by the conditional flag indicates that a condition for the conditional execution instruction is satisfied, an operation specified by the operation code in the conditional execution instruction.

With the stated construction, the processor of the present invention uses an instruction set including conditional flag setting instructions and instructions which are executed when their conditions are satisfied, not including instructions which are executed when their conditions are not satisfied. Therefore, the instruction set includes only one type of instruction which is executed when its condition is satisfied for each operation.

A conventional processor uses ten types of conditional instructions for each operation and two types of instructions which are executed when their conditions are satisfied. As the number of operations of instructions which are executed when their conditions are satisfied increases, the processor of the present invention uses less types of the instructions.

Accordingly, hardware scale and cost of an instruction decoder can be reduced. Also, when the number of types of instructions are limited, the processor of the present invention can use conditional instructions for more operations. Therefore, when the processor of the present invention performs pipeline processing, branch hazards can be reduced.

Here, each of the first conditional flag setting instruction and the second conditional flag setting instruction may specify two comparison objects a and b, where the instruction set is assigned three types of first conditional flag setting instructions and three types of second conditional flag setting instructions, the first conditions of the first conditional flag setting instructions being a combination of the following conditions: 1. one out of "a=b" and "a≠b"; 2. one out of "a≧b" and "a<b"; and 3. one out of "a≦b" and "a>b", the second conditions of the second conditional instructions being three mutually exclusive conditions for the three first conditions.

With the stated construction, the processor of the present invention uses six types of conditional flag setting instructions and the conditions of these instructions are three pairs of exclusive conditions. Therefore, without instructions which are executed when their conditions are not satisfied, the processor of the present invention can perform the same processing as a conventional processor.

Accordingly, the number of types of instructions can be reduced without sacrificing the performance of the processor of the present invention.

Here, the instruction set may be further assigned two types of first conditional flag setting instructions and two types of second conditional flag setting instructions, the first conditions of the first conditional flag setting instructions being a combination of the following conditions: 4. one out of "a≧b" and "a<b"; and 5. one out of "a≧b" and "a>b" (where a and b of conditions 4 and 5 are compared with signs of a and b being taken into account), and the second conditions of the second conditional flag setting instructions being mutually exclusive with the first conditions.

With the stated construction, the processor of the present invention uses ten types of conditional flag setting instructions and the conditions of these instructions are five pairs of exclusive conditions. Therefore, without instructions which are executed when their conditions are not satisfied, the processor of the present invention can perform the same processing as a conventional processor.

Accordingly, the number of types of instructions can be reduced without sacrificing the performance of the processor of the present invention.

Here, an operation code included in a conditional execution instruction may be one of a transfer operation code, an arithmetic operation code, a logic operation code, and a branch operation code.

With the stated construction, the operation of each instruction which is executed when its condition is satisfied included in the instruction set of the processor of the present invention is a transfer operation, an arithmetic operation, a logic operation, or a branch operation.

Therefore, the processor of the present invention can use transfer instructions which are executed when their conditions are satisfied, arithmetic instructions which are executed when their conditions are satisfied, and logic instructions which are executed when their conditions are satisfied, and branch instructions which are executed when their conditions are satisfied. Accordingly, when the processor of the present invention performs pipeline processing, branch hazards can be reduced.

To achieve the above object, the instruction conversion apparatus of the present invention converts instruction sequences not including conditional instructions into instruction sequences including conditional instructions, each of the conditional instructions including a condition and an operation code and having a processor execute an operation specified by the operation code only if the condition is satisfied, and includes: an obtaining unit for obtaining an instruction sequence which does not include conditional instructions; an instruction sequence detection unit for detecting, out of the obtained instruction sequence, a conversion target instruction sequence which transfers different transfer objects to a same storage resource depending on whether a predetermined condition is satisfied; a judging unit for judging whether an instruction set of a specialized processor is assigned a conditional instruction including a same condition as the predetermined condition; and a conversion unit for converting, when a judgement result by the judging unit is affirmative, the conversion target instruction sequence into an instruction sequence including a conditional instruction including the predetermined condition and for interchanging, when the judgement result by the judging unit is negative, the transfer objects of the conversion target instruction sequence and converts the conversion target instruction sequence into an instruction sequence including a conditional instruction including a condition that is mutually exclusive with the predetermined condition.

With the stated construction, the instruction conversion apparatus of the present invention does not generate undecodable conditional instructions but decodable conditional instructions for the specialized processor.

Therefore, the instruction conversion apparatus of the present invention can reduce the number of types of conditional instructions without reducing total number of conditional instructions, so that the number of fields for including instructions and a code size can be reduced. Also, the number of types of conditional instructions decodable by the specialized processor can be reduced without sacrificing the performance of the specialized processor.

Accordingly, hardware scale of an instruction decoder of the specialized processor can be reduced. Also, when the number of types of instructions is limited, the specialized processor can use conditional instructions for more operations in comparison with a conventional processor. As a result, when the specialized processor performs pipeline processing, branch hazards can be reduced.

Here, the instruction set of the specialized processor may be assigned a conditional instruction including a condition that is mutually exclusive with a condition included in a conditional instruction judged as not assigned to the instruction set by the judging unit, and conditions included in conditional instructions for a same operation assigned to the instruction set are not mutually exclusive.

With the stated construction, the judging unit of the instruction conversion apparatus of the present invention judges that the specialized processor uses an instruction set including conditional instructions specifying only one out of a pair of exclusive conditions. Therefore, the instruction conversion apparatus of the present invention does not generate conditional instructions specifying the other of the pair of exclusive conditions.

Here, execution of a conditional instruction may be only possible after a comparison instruction, and the instruction set may be assigned three types of conditional instructions for each operation according to a relation between magnitudes of two comparison objects compared by the comparison instruction, the conditions of the three types of conditional instructions being: 1. one out of "a=b" and "a≠b"; 2. one out of "a≧b" and "a<b"; and 3. one out of "a≦b" and "a>b".

With the stated construction, the judging unit of the instruction conversion apparatus of the present invention judges that the specialized processor can decode three types of conditional instructions for each operation. Therefore, the number of types of conditional instructions is reduced by half of six types of conditional instructions for a conventional processor.

Here, each of the transfer objects is one of a numerical value, a value indicated by a different storage resource, an operation result of a numerical value and a value indicated by the different storage resource, an operation result of numerical values, and an operation result of values indicated by the different storage resource.

With the stated construction, the operation specified by a conditional instruction is a transfer operation, an arithmetic operation, and a logic operation.

Therefore, the instruction conversion apparatus can generate conditional instructions for all of transfer instructions, arithmetic instructions, and logic instructions. Accordingly, when the specialized processor performs pipeline processing, branch hazards is reduced.

Here, the conversion target instruction sequence may consecutively include a conditional branch instruction for branching to a next instruction but two, a transfer instruction for transferring a transfer object to a storage resource, an unconditional branch instruction for branching to a next instruction but one, and a transfer instruction for transferring another transfer object to the storage resource.

With the stated construction, the instruction sequence detection unit detects this instruction sequence.

To achieve the above object, the instruction conversion apparatus of the present invention converts conditional instructions included in instruction sequences, each of the conditional instructions including a condition and an operation code and having a processor execute an operation specified by the operation code only if the condition is satisfied, and includes: an obtaining unit for obtaining an instruction sequence including conditional instructions; a conditional instruction detection unit for detecting a conditional instruction included in the obtained instruction sequence; a first judging unit for judging whether the detected conditional instruction is assigned to an instruction set of a specialized processor; a second judging unit for judging, when a judgement result by the first judging unit is negative, whether the obtained instruction sequence includes a conversion target instruction sequence which transfers different transfer objects to a same storage resource depending on whether a predetermined condition of the detected conditional instruction is satisfied; and a conversion unit for interchanging, when a judgement result by the second judging unit is affirmative, the transfer objects and converts the detected conditional instruction into a conditional instruction including a condition that is mutually exclusive with the predetermined condition.

With the stated construction, the instruction conversion apparatus of the present invention can converts undecodable conditional instructions into decodable conditional instructions for the specialized processor.

Therefore, the instruction conversion apparatus of the present invention can reduce the number of types of conditional instructions without reducing total number of conditional instructions, so that the number of fields for including instructions and a code size can be reduced. Also, the number of types of conditional instructions decodable by the specialized processor can be reduced without sacrificing the performance of the specialized processor.

Accordingly, hardware scale of an instruction decoder of the specialized processor can be reduced. Also, when the number of types of instructions is limited, the specialized processor can use conditional instructions for more operations. As a result, when the specialized processor performs pipeline processing, branch hazards can be reduced.

Here, the instruction set of the specialized processor may be assigned a conditional instruction including a condition being mutually exclusive with a condition included in a conditional instruction judged as not assigned to the instruction set by the first judging unit, and conditions included in conditional instructions for a same operation assigned to the instruction set are not mutually exclusive.

With the stated construction, the first judging unit of the instruction conversion apparatus of the present invention judges that the specialized processor uses an instruction set including conditional instructions specifying only one out of a pair of exclusive conditions. Therefore, the instruction conversion apparatus of the present invention does not generate conditional instructions specifying the other of the pair of exclusive conditions.

Here, the conversion target instruction sequence consecutively may include a comparison instruction for comparing two comparison objects, a transfer instruction for transferring a predetermined transfer object to a predetermined storage resource, and a conditional instruction for transferring a transfer object that differs from the predetermined transfer object to the predetermined storage resource only if a predetermined condition is satisfied.

With the stated construction, the instruction sequence detection unit detects this instruction sequence.

Here, the conversion unit may include: an inverse conversion unit for converting, when a judgement result by the second judging unit is negative, the instruction sequence including the detected conditional instruction into an instruction sequence not including the detected conditional instruction.

With the stated construction, even if a conditional instruction cannot be decoded by the specialized processor and cannot be converted into a conditional instruction which can be decoded by the specialized process, this conditional instruction is converted into an original instruction sequence.

Therefore, the instruction conversion apparatus of the present invention generates executable instruction sequences for the specialized processor.

To achieve the above object, the instruction conversion apparatus of the present invention converts an instruction sequence not including a conditional flag setting instruction and a conditional execution instruction into an instruction sequence including a conditional flag setting instruction and a conditional execution instruction, each conditional flag setting instruction including a condition, having a specialized processor judge whether the condition is satisfied, and having a conditional flag hold a judgement result as to whether the condition is satisfied, each conditional execution instruction including an operation code and having the specialized processor execute an operation specified by the operation code only if a condition of the conditional execution instruction is satisfied. The instruction conversion apparatus includes: an obtaining unit for obtaining an instruction sequence which does not include conditional flag setting instructions and conditional execution instructions; an instruction sequence detection unit for detecting, out of the obtained instruction sequence, a conversion target instruction sequence which transfers different transfer objects to a same storage resource depending on whether a predetermined condition is satisfied; and a conversion unit for converting the conversion target instruction sequence into an instruction sequence which includes a conditional flag setting instruction including the predetermined condition and a conditional execution instruction including an operation code which specifies an operation for transferring a transfer object to the storage resource when the predetermined condition is satisfied.

With the stated construction, the instruction conversion apparatus of the present invention generates decodable conditional flag setting instruction and decodable instructions which are executed when their conditions are satisfied for the specialized processor.

Therefore, the instruction conversion apparatus of the present invention can reduce the number of types of conditional instructions without reducing total number of conditional instructions, so that the number of fields for including instructions and a code size can be reduced. Also, the number of types of conditional instructions decodable by the specialized processor can be reduced without sacrificing the performance of the specialized processor.

Accordingly, hardware scale of an instruction decoder of the specialized processor can be reduced. Also, when the number of types of instructions is limited, the specialized processor can use conditional instructions for more operations. As a result, when the specialized processor performs pipeline processing, branch hazards can be reduced.

When the specialized processor uses instructions which are executed when their conditions are satisfied for 20 operations, for instance, it is enough to include in an instruction set 30 types of instructions including 10 types of conditional flag setting instruction and 20 types of instruction which are executed when their conditions are satisfied (one type of the instruction which is executed when its condition is satisfied×20 operations).

Here, a condition of a conditional flag setting instruction which is convertible by the conversion unit may be mutually exclusive with a condition of another conditional flag setting instruction which is convertible by the conversion unit.

With the stated construction, during the generation of instructions which are executed when their conditions are not satisfied, it is enough for the instruction conversion apparatus of the present invention to generate conditional flag setting instruction specifying exclusive conditions and instructions which are executed when their conditions are satisfied. Therefore, the instruction set does not need to include instructions which are executed when their conditions are not satisfied.

Accordingly, instructions which are executed when their conditions are not satisfied can be eliminated without sacrificing the performance of the specialized processor.

Here, each conditional flag setting instruction may specify two comparison objects a and b, where the instruction set is assigned three types of first conditional flag setting instructions and three types of second conditional flag setting instructions, the first conditions of the first conditional flag setting instructions being a combination of the following conditions: 1. one out of "a=b" and "a≠b"; 2. one out of "a≧b" and "a<b"; and 3. one out of "a≦b" and "a>b", the second conditions of the second conditional flag setting instructions being three mutually exclusive conditions for the three first conditions.

With the stated construction, the conversion unit of the instruction conversion apparatus of the present invention generates six types of conditional flag setting instruction. Each pair of the conditions of these instructions is in an exclusive relation. Therefore, even if an instruction set does not include instructions which are executed when their conditions are not satisfied, the same processing as a conventional processor can be performed.

Accordingly, the number of types of instructions can be reduced without sacrificing the performance of the specialized processor.

Here, the conversion target instruction sequence may consecutively include a comparison instruction for comparing two comparison objects, a conditional branch instruction for branching to a next instruction but two when a predetermined condition is satisfied, a transfer instruction for transferring a predetermined transfer object to a predetermined storage resource, an unconditional branch instruction for branching to a next instruction but one, and a transfer instruction for transferring a transfer object that differs from the predetermined transfer object to the predetermined storage resource.

With the stated construction, the instruction sequence detection unit detects this instruction sequence.

Here, the conversion target instruction sequence may consecutively include a comparison instruction for comparing two comparison objects, a transfer instruction for transferring a predetermined transfer object to a predetermined storage resource, and a conditional instruction for transferring a transfer object that differs from the predetermined transfer object to the predetermined storage resource only if a predetermined condition is satisfied.

With the stated construction, the instruction sequence detection unit detects this instruction sequence.

Here, the conversion target instruction sequence may consecutively include a comparison instruction for comparing two comparison objects, a conditional instruction for transferring a predetermined transfer object to a predetermined storage resource only if a predetermined condition is not satisfied, and a conditional instruction for transferring a transfer object that differs from the predetermined transfer object to the predetermined storage resource only if the predetermined condition is satisfied.

With the stated construction, the instruction sequence detection unit detects this instruction sequence.

To achieve the above object, the computer-readable recording medium of the present invention records an instruction conversion program for having a computer perform a method of converting instruction sequences not including conditional instructions into instruction sequences including conditional instructions, each of the conditional instructions including a condition and an operation code and having a processor execute an operation specified by the operation code only if the condition is satisfied. The program includes: an obtaining step for obtaining an instruction sequence which does not include conditional instructions; an instruction sequence detection step for detecting, out of the obtained instruction sequence, a conversion target instruction sequence which transfers different transfer objects to a same storage resource depending on whether a predetermined condition is satisfied; a judging step for judging whether an instruction set of a specialized processor is assigned a conditional instruction including a same condition as the predetermined condition; and a conversion step for converting, when a judgement result in the judging step is affirmative, the conversion target instruction sequence into an instruction sequence including a conditional instruction including the predetermined condition and for interchanging, when the judgement result in the judging step is negative, the transfer objects of the conversion target instruction sequence and converts the conversion target instruction sequence into an instruction sequence including a conditional instruction including a condition that is mutually exclusive with the predetermined condition.

With the stated steps, the instruction conversion program of the present invention does not generate undecodable conditional instructions but decodable conditional instructions for the specialized processor.

Therefore, the instruction conversion program of the present invention can reduce the number of types of conditional instructions without reducing total number of conditional instructions, so that the number of fields for including instructions and a code size can be reduced. Also, the number of types of conditional instructions decodable by the specialized processor can be reduced without sacrificing the performance of the specialized processor.

Accordingly, hardware scale of an instruction decoder of the specialized processor can be reduced. Also, when the number of types of instructions is limited, the specialized processor can use conditional instructions for more operations in comparison with a conventional processor. As a result, when the specialized processor performs pipeline processing, branch hazards can be reduced.

To achieve the above object, the computer-readable recording medium of the present invention records an instruction conversion program for having a computer perform a method of converting conditional instructions included in instruction sequences, each of the conditional instructions including a condition and an operation code and having a processor execute an operation specified by the operation code only if the condition is satisfied. The program includes: an obtaining step for obtaining an instruction sequence including conditional instructions; a conditional instruction detection step for detecting a conditional instruction included in the obtained instruction sequence; a first judging step for judging whether the detected conditional instruction is assigned to an instruction set of a specialized processor; a second judging step for judging, when a judgement result in the first judging step is negative, whether the obtained instruction sequence includes a conversion target instruction sequence which transfers different transfer objects to a same storage resource depending on whether a predetermined condition of the detected conditional instruction is satisfied; and a conversion step for interchanging, when a judgement result in the second judging step is affirmative, the transfer objects and converts the detected conditional instruction into a conditional instruction including a condition that is mutually exclusive with the predetermined condition.

With the stated steps, the instruction conversion program of the present invention can converts undecodable conditional instructions into decodable conditional instructions for the specialized processor.

Therefore, the instruction conversion program of the present invention can reduce the number of types of conditional instructions without reducing total number of conditional instructions, so that the number of fields for including instructions and a code size can be reduced. Also, the number of types of conditional instructions decodable by the specialized processor can be reduced without sacrificing the performance of the specialized processor.

Accordingly, hardware scale of an instruction decoder of the specialized processor can be reduced. Also, when the number of types of instructions is limited, the specialized processor can use conditional instructions for more operations. As a result, when the specialized processor performs pipeline processing, branch hazards can be reduced.

To achieve the above object, the computer-readable recording medium of the present invention records an instruction conversion program for having a computer perform a method of converting an instruction sequence not including a conditional flag setting instruction and a conditional execution instruction into an instruction sequence including a conditional flag setting instruction and a conditional execution instruction, each conditional flag setting instruction including a condition, having a specialized processor judge whether the condition is satisfied, and having a conditional flag hold a judgement result as to whether the condition is satisfied, each conditional execution instruction including an operation code and having the specialized processor execute an operation specified by the operation code only if a condition of the conditional execution instruction is satisfied. The program includes: an obtaining step for obtaining an instruction sequence which does not include conditional flag setting instructions and conditional execution instructions; an instruction sequence detection step for detecting, out of the obtained instruction sequence, a conversion target instruction sequence which transfers different transfer objects to a same storage resource depending on whether a predetermined condition is satisfied; and a conversion step for converting the conversion target instruction sequence into an instruction sequence which includes a conditional flag setting instruction including the predetermined condition and a conditional execution instruction including an operation code which specifies an operation for transferring a transfer object to the storage resource when the predetermined condition is satisfied.

With the stated steps, the instruction conversion program of the present invention generates decodable conditional flag setting instruction and decodable instructions which are executed when their conditions are satisfied for the specialized processor.

Therefore, the instruction conversion program of the present invention can reduce the number of types of conditional instructions without reducing total number of conditional instructions, so that the number of fields for including instructions and a code size can be reduced. Also, the number of types of conditional instructions decodable by the specialized processor can be reduced without sacrificing the performance of the specialized processor.

Accordingly, hardware scale of an instruction decoder of the specialized processor can be reduced. Also, when the number of types of instructions is limited, the specialized processor can use conditional instructions for more operations. As a result, when the specialized processor performs pipeline processing, branch hazards can be reduced.

When the specialized processor uses instructions which are executed when their conditions are satisfied for 20 operations, for instance, it is enough to include in an instruction set 30 types of instructions including 10 types of conditional flag setting instruction and 20 types of instruction which are executed when their conditions are satisfied (one type of the instruction which is executed when its condition is satisfied×20 operations).

As described above, the present invention has great practical uses.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 2 shows a list of example conditional transfer instructions which the processor Embodiment 1 can execute;

FIGS. 4A and 4B show examples of C source programs written in C language;

FIGS. 5A and 5B show intermediate code sequences which do not include conditional transfer instructions and are respectively generated from the C source programs shown in FIGS. 4A and 4B;

FIGS. 6A and 6B show intermediate code sequences which include conditional transfer instructions and are respectively generated from the intermediate code sequence shown in FIGS. 5A and 5B;

FIGS. 7A and 7B show machine instruction sequences respectively generated from the intermediate code sequences shown in FIGS. 6A and 6B;

FIG. 9 shows an intermediate code sequence including a conditional transfer instruction generated from the C source program shown in FIG. 4B;

FIG. 10 shows a list of example conditional branch instructions which the processor of Embodiment 3 can execute;

FIG. 12 shows an intermediate code sequence which the processor of Embodiment 3 can decode and is generated from the intermediate code sequence shown in FIG. 5B which the process of Embodiment 3 cannot decode;

FIG. 13 shows a machine instruction sequence generated from the intermediate code sequence shown in FIG. 12;

FIG. 14 shows comparison instructions, a conditional addition instruction, a conditional transfer instruction, and a conditional branch instruction of Embodiment 4, where the number of types of instructions is reduced;

FIG. 16 shows an example of the C source code 1511 which is written in C language and is input into the compiler of Embodiment 4;

FIG. 17 shows the first intermediate code 1512;

FIG. 18 shows the second intermediate code 1513;

FIG. 19 shows the machine instruction 1515;

FIG. 21 shows the first intermediate code 1512;

FIG. 23 shows the first intermediate code 1512;

FIG. 25 shows a list of example conditional addition instructions which the processor of Embodiment 1 can execute;

FIG. 26 shows an example of a C source program written in C language;

FIG. 27 shows an intermediate code sequence which does not include conditional addition instructions and is generated from the C source program shown in FIG. 26;

FIG. 28 shows an intermediate code sequence which includes a conditional addition instruction and is generated from the intermediate code sequence shown in FIG. 27;

FIG. 29 shows a machine instruction sequence generated from the intermediate code sequence shown in FIG. 28;

FIG. 30 shows an instruction sequence including a conventional conditional transfer instruction;

FIG. 31 shows a list of conventional transfer instructions;

FIG. 32 shows a conventional comparison instruction (CMP instruction), conditional addition instructions which are executed when their conditions are satisfied, conditional transfer instructions which are executed when their conditions are satisfied, and conditional branch instructions which are executed when their conditions are satisfied; and FIG. 33 shows comparison instructions, conditional addition instructions, conditional transfer instructions, and conditional branch instructions, where the number of types of instructions is reduced.

DESCRIPTION OF THE PREFERRED EMBODIMENTS

Figure 1:
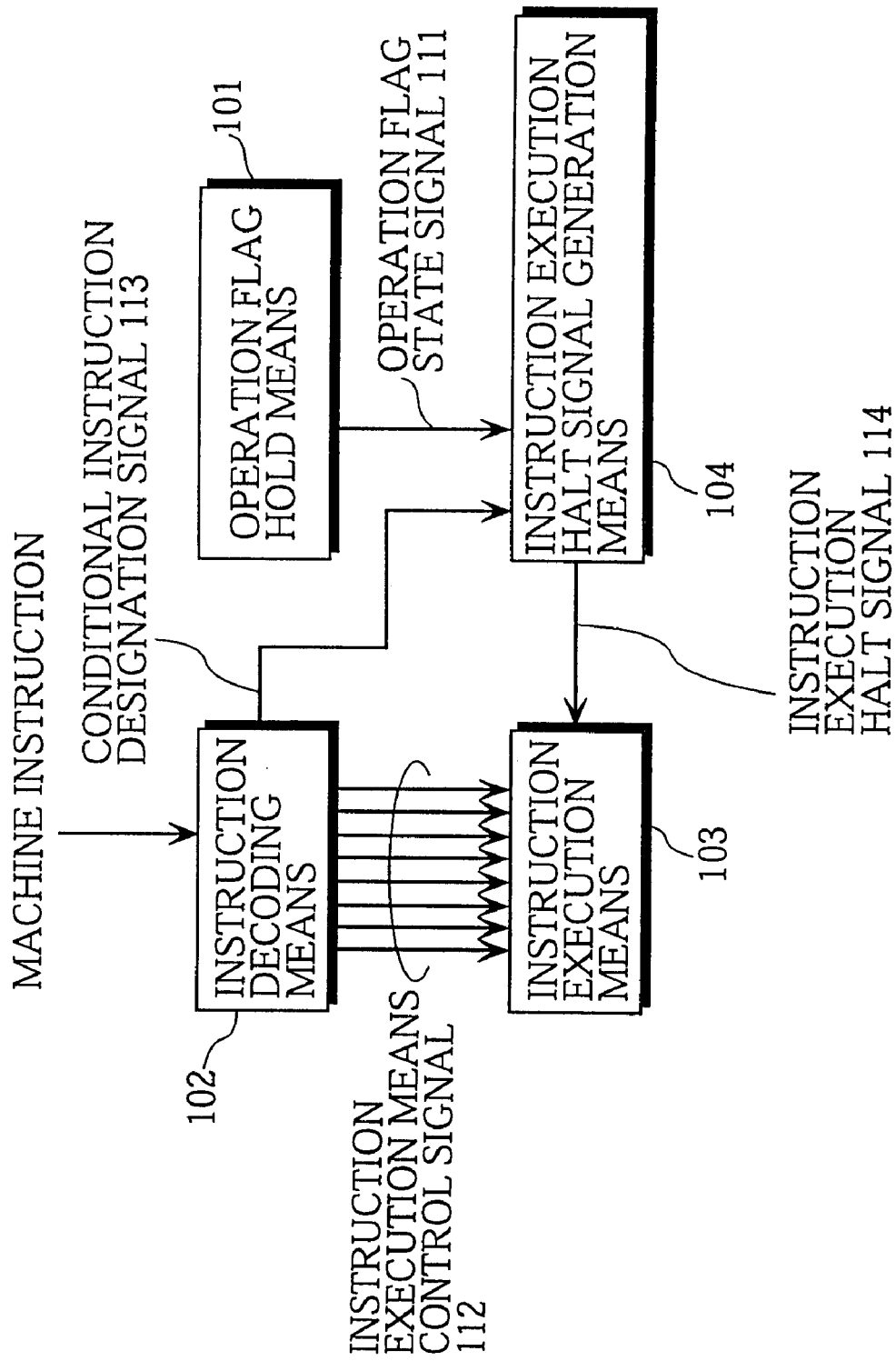
FIG. 1 shows a construction of the processor of the present invention which executes machine instructions generated by the compiler of the present invention.

FIG. 1 shows the construction of the processor of the present invention which executes machine instructions generated by the compiler of the present invention.

This processor includes the operation flag hold means 101, instruction decoding means 102, the instruction execution means 103, and the instruction execution halt means 104.

The operation flag hold means 101 holds an operation flag showing an instruction execution state, and outputs the operation flag state signal 111 showing the instruction execution state.

The instruction decoding means 102 decodes machine instructions and outputs the instruction execution means control signal 112. When decoding conditional instructions, the instruction decoding means 102 outputs the conditional instruction designation signal 113.

The instruction execution means 103 executes instructions according to the instruction execution means control signal output from the instruction decoding means 102.

The instruction execution halt means 104 receives the operation flag state signal 111 output from the operation flag hold means 101 and the conditional instruction designation signal 113 output from the instruction decoding means 102. When a condition is not satisfied, the instruction execution halt means 104 outputs the instruction execution halt signal 114 to the instruction execution means 103 so that the instruction execution means 103 halts its instruction execution.

It should be noted here that in this processor, the instruction execution halt means 104 may be replaced by an instruction execution continuation means and, when a condition is satisfied, the instruction execution continuation means may output an instruction execution signal to the instruction execution means 103 so that the instruction execution means 103 executes instructions. The processor including the instruction execution halt means 104 and the processor including the instruction execution continuation means are effectively the same, only with inverse logic.

Embodiment 1

Among the six conditional transfer instructions shown in FIG. 31, the processor of Embodiment 1 decodes and executes conditional transfer instructions specifying one out of a pair of conditions in an exclusive relation and does not decode and execute conditional transfer instructions specifying the other of the pair of conditions. Here, examples of conditions in an exclusive relation are "a=b" and "a≠b", and "a>b" and "a≦b".

More specifically, when two operation objects "a" and "b" are compared by a comparison instruction, the present processor decodes and executes a conditional instruction specifying one out of a pair of conditions that are '"a" and "b" are equal' and '"a" and "b" are not equal'.

Similarly, the present processor decodes and executes a conditional instruction specifying one out of a pair of conditions that are "'a' is greater than 'b'" and "'a' is equal to or smaller than 'b'", and decodes and executes a conditional instruction specifying one out of a pair of conditions that are "'a' is smaller than 'b'" and "'a' is equal to or greater than 'b'".

FIG. 2 shows a list of conditional transfer instructions which the present processor can execute. This list includes three types of conditional transfer instructions 201. Each of the conditions 202 is a sign indicating the condition specified by one conditional transfer instruction. When two operation objects "a" and "b" are compared by a comparison instruction, the condition of the instruction "moveq" 203 is that "a" and "b" are equal; the condition of the instruction "movgt" 204 is that "a" is greater than "b"; and the condition of the instruction "movge" 205 is that "a" is equal to or greater than "b". Each of these conditional transfer instructions executes transfer when its condition is satisfied.

The present compiler generates only the conditional transfer instructions shown in FIG. 2, out of the conditional transfer instructions shown in FIG. 31.

Figure 3:
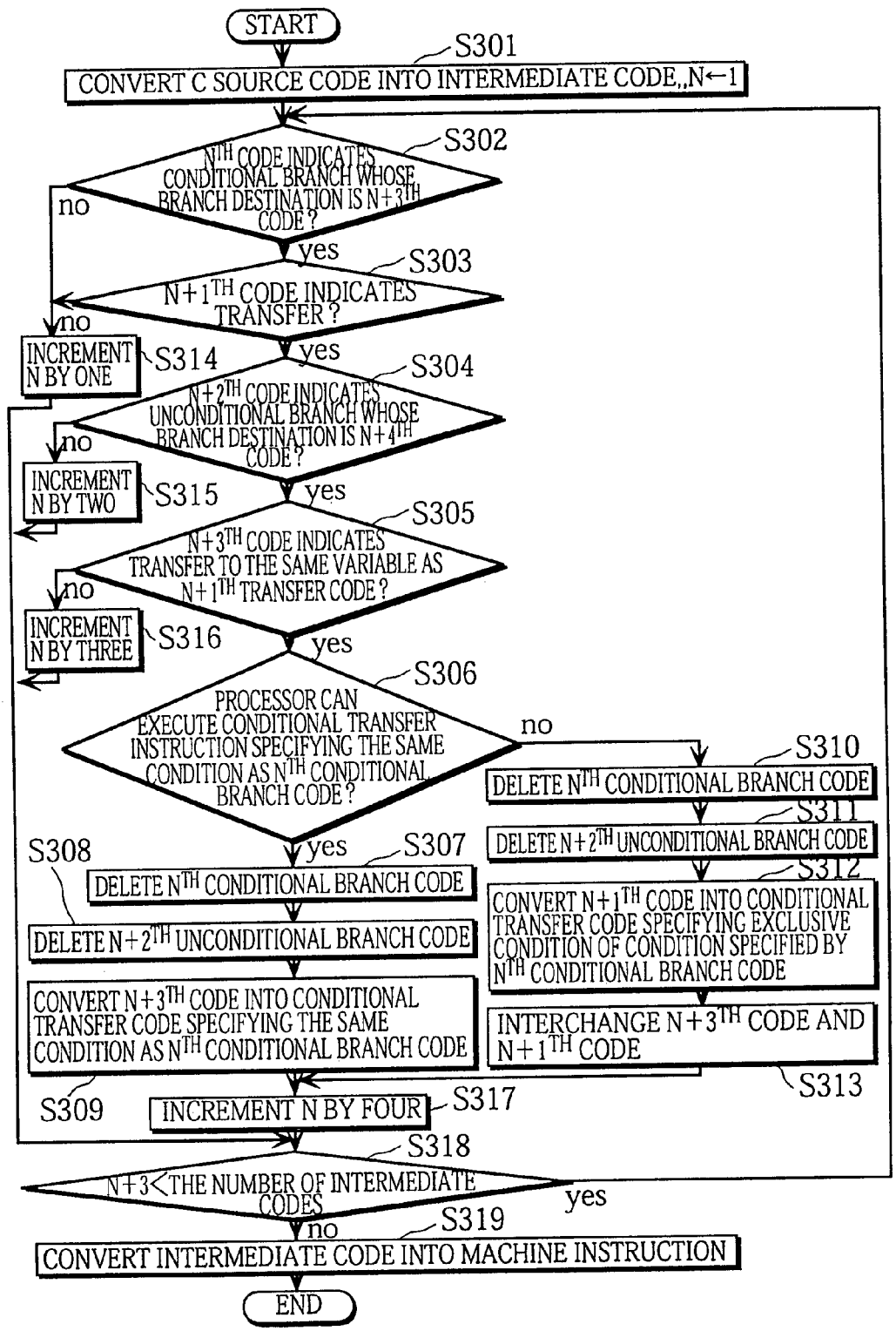
FIG. 3 is a flowchart showing the operation of the compiler of Embodiment 1.

FIG. 3 is a flowchart showing the operation of the compiler of Embodiment 1.

Figures 4A, 4B:
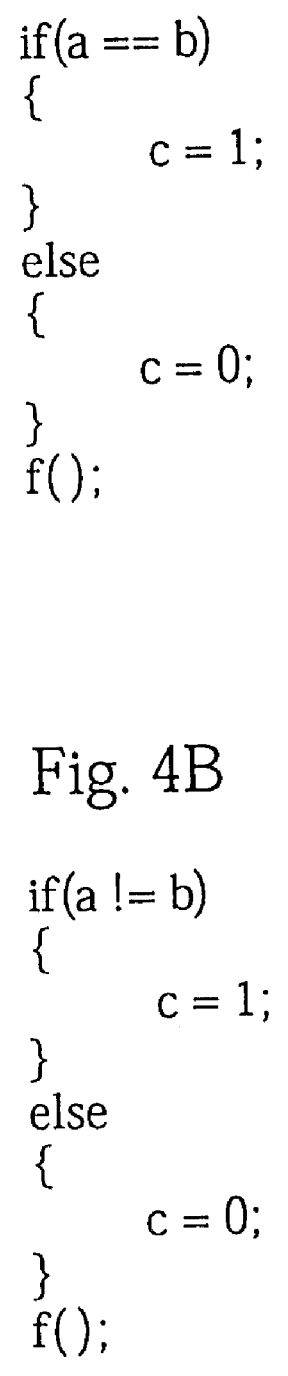

FIGS. 4A and 4B show example C source programs which are written in C language and are input into the present compiler.

With the C source program shown in FIG. 4A, the variable "a" and the variable "b" are compared and, when they are equal, "1" is assigned to the variable "c"; when they are not equal, "0" is assigned to the variable "c" and the function "f" is called.

With the C source program shown in FIG. 4B, the variable "a" and the variable "b" are compared and, when they are not equal, "1" is assigned to the variable "c"; when they are equal, "0" is assigned to the variable "c"; and the function "f" is called.

FIGS. 5A and 5B show intermediate code sequences which do not include conditional transfer instructions and are respectively generated from the C source programs shown in FIGS. 4A and 4B in step S301 of the flowchart shown in FIG. 3. Note that FIGS. 5A and 5B show the same intermediate code sequences as those generated by a conventional compiler during the conversion of the C source programs shown in FIGS. 4A and 4B into machine instructions.

In FIG. 5A, the intermediate code 501 is a code for comparing the variables "a" and "b" and setting a flag to indicate the comparison result; the intermediate code 502 is a code for branching to the label "Lt" 507 when the variables "a" and "b" are equal; the intermediate code 503 is a code for transferring the immediate "0" to the variable "c"; the intermediate code 504 is a code for branching to the label "L" 508; the intermediate code 505 is a code for transferring the immediate "1" to the variable "c"; and the intermediate code 506 is a code for calling the function "f".

In FIG. 5B, the intermediate code 511 is a code for comparing the variables "a" and "b" and setting a flag to indicate the comparison result; the intermediate code 512 is a code for branching to the label "Lt" 517 when the variables "a" and "b" are not equal; the intermediate code 513 is a code for transferring the immediate "0" to the variable "c"; the intermediate code 514 is a code for branching to the label "L" 518; the intermediate code 515 is a code for transferring the immediate "1" to the variable "c"; and the intermediate code 516 is a code for calling the function "f".

FIGS. 6A and 6B show intermediate code sequences including conditional transfer instructions. These intermediate code sequences are respectively generated by the present compiler from the intermediate code sequences not including conditional transfer instructions shown in FIGS. 5A and 5B in steps S302–S118 of the flowchart shown in FIG. 3.

In FIG. 6A, the intermediate code 601 is a code for comparing the variables "a" and "b" and setting a flag to indicate the comparison result; the intermediate code 602 is a code for transferring the immediate "0" to the variable "c"; the intermediate code 603 is a code for transferring the immediate "1" to the variable "c" when the variables "a" and "b" are equal; and the intermediate code 604 is a code for calling the function "f".

In FIG. 6B, the intermediate code 611 is a code for comparing the variables "a" and "b" and setting a flag to indicate the comparison result; the intermediate code 612 is a code for transferring the immediate "1" to the variable "c"; the intermediate code 613 is a code for transferring the immediate "0" to the variable "c" when the variables "a" and "b" are equal; and the intermediate code 614 is a code for calling the function "f".

FIGS. 7A and 7B show machine instruction sequences. The machine instruction sequences are respectively generated by the present compiler from the intermediate code sequences including conditional transfer instructions shown in FIGS. 6A and 6B in step S319 of the flowchart shown in FIG. 3. Note that the machine instruction sequences shown in FIGS. 7A and 7B are respectively the same as those generated from intermediate code sequences including conditional transfer instructions shown in FIGS. 6A and 6B.

In FIG. 7A, the machine instruction 701 is an instruction for comparing the values of registers "r0" and "r1" and setting a flag to indicate the comparison result; the machine instruction 702 is an instruction for transferring the immediate "0" to the register "r2"; the machine instruction 703 is an instruction for transferring the immediate "1" to the register "r2" when the values of the registers "r0" and "r1" are equal; and the machine instruction 704 is an instruction for calling the function "f".

In FIG. 7B, the machine instruction 711 is an instruction for comparing the values of registers "r0" and "r1" and setting a flag to indicate the comparison result; the machine instruction 712 is an instruction for transferring the immediate "1" to the register "r2"; the machine instruction 713 is an instruction for transferring the immediate "0" to the register "r2" when the values of the registers "r0" and "r1" are equal; and the machine instruction 714 is an instruction for calling the function "f".

The following is a description of the process in the case where the C source program shown in FIG. 4A is input into the present compiler, with reference to FIG. 3.

(1a) The input C source program is converted into an intermediate code sequence without a conditional transfer instruction and the initial value "1" is assigned to the variable n (step S301). In this example, the C source program shown in FIG. 4A is converted into the intermediate code sequence shown in FIG. 5A.

(2a) The compiler judges whether the $n^{th}$ intermediate code is an intermediate code indicating a conditional branch whose branch destination is the $n+3^{th}$ code (step S302). This process is repeated by incrementing n by one until the judgement result becomes Yes (in this repetition, the judgement result in step S302 is No, the process proceeds to step S314, and the result in step S318 is Yes). In this example, the intermediate code 502 shown in FIG. 5A indicates a conditional branch whose branch destination is the n+3$^{th}$ code, so that the judgement result in step S302 becomes Yes when n is 2 and the process proceeds to the judgement in step S303.

(3a) The compiler judges whether the n+1$^{th}$ intermediate code indicates a transfer (step S303). When the judgement result is No, n is incremented by one and the process returns to step S302 to find an intermediate code indicating a conditional branch (in this case, the judgement result in step S303 is No, the process proceeds to step S314, and the judgement result in step S318 is Yes). In this example, the intermediate code 503 shown in FIG. 5A is an intermediate code indicating a transfer, so that the judgement result in step S303 becomes Yes when n+1 is 3 and the process proceeds to step S304.

(4a) The compiler judges whether the n+2$^{th}$ intermediate code is an intermediate code indicating an unconditional branch whose branch destination is the n+4$^{th}$ code (step S304). When the judgement result is No, n is incremented by 2 and the process returns to step S302 to find an intermediate code indicating a conditional branch (in this case, the judgement result in step S304 is No, the process proceeds to step S315, and the judgement result in step S318 is Yes). In this example, the intermediate code 504 shown in FIG. 5A indicates an unconditional branch whose branch destination is the n+4$^{th}$ code so that, when n+2 is 4, the judgement result in step S304 becomes Yes and the process proceeds to step S304.

(5a) The compiler judges whether the n+3$^{th}$ intermediate code and the n+1$^{th}$ intermediate code indicate transfers to the same variable (step S305). When the judgement result is No, n is incremented by 3 and the process returns to step S302 to find an intermediate code indicating a conditional branch (in this case, the judgement result in step S305 is No, the process proceeds to step S316, and the judgement result in step S318 is Yes). In this example, the intermediate code 505 shown in FIG. 5A indicates a transfer to the same variable as the intermediate code 503. Therefore, when n+3 is 5, the judgement result in step S305 becomes Yes and the process proceeds to step S306.

(6a) The compiler judges whether the present processor can execute a conditional transfer instruction specifying the same condition as that specified by the n$^{th}$ intermediate code indicating a conditional branch (step S306). In this example, the condition specified by the intermediate code 502 indicating a conditional branch shown in FIG. 5A is that "a" and "b" are equal. As shown in FIG. 2, the present processor can execute a conditional transfer instruction specifying the same condition, so that the judgement result becomes Yes and the process proceeds to the conversion process in step S307.

(7a) The n$^{th}$ intermediate code indicating a conditional branch is deleted (step S307).

(8a) The n+2$^{th}$ intermediate code indicating an unconditional branch is deleted (step S308).

(9a) The n+3$^{th}$ intermediate code indicating a transfer is converted into a conditional transfer instruction specifying the same condition as that specified by the n$^{th}$ intermediate code indicating a conditional branch (step S309).

(10a) N is incremented by 4 and the compiler judges whether there is any other intermediate code to be processed (steps S317 and S318). If so, the process in steps S302–318 is repeated. In this example, the intermediate code sequence including a conditional transfer instruction shown in FIG. 6A is generated.

(11a) An intermediate code sequence including conditional transfer instructions is inverted into a machine instruction sequence (step S319). In this example, the intermediate code sequence shown in FIG. 6A is converted into the machine instruction sequence shown in FIG. 7A.

The following description concerns the process in the case where the C source program shown in FIG. 4B is input into the present compiler.

(1b) In step S301, the C source program shown in FIG. 4B is converted into the intermediate code sequence shown in FIG. 5B.

(2b) The intermediate code 512 shown in FIG. 5B indicates a conditional branch whose branch destination is the n+3$^{th}$ intermediate code. Therefore, when n is 2, the judgement result in step S302 becomes Yes and the process proceeds to step S303.

(3b) The intermediate code 513 shown in FIG. 5B indicates a transfer so that, when n+1 is 3, the judgement result in step S303 becomes Yes and the process proceeds to the judgement in step S304.

(4b) The intermediate code 514 shown in FIG. 5B indicates an unconditional branch whose branch destination is the n+4$^{th}$ intermediate code. Therefore, when n+2 is 4, the judgement result in step S304 becomes Yes and the process proceeds to the judgement in step S304.

(5b) The intermediate code 515 shown in FIG. 5B indicates a transfer to the same variable as intermediate code 513. Therefore, when n+3 is 5, the judgement result in step S305 becomes Yes and the process proceeds to step S306.

(6b) The condition specified by the intermediate code 512 indicating a conditional branch shown in FIG. 5B is that "a" and "b" are not equal. As shown in FIG. 5B, the present processor cannot execute a conditional transfer instruction specifying the same condition, so that the judgement result in step S306 is No and the process proceeds to the conversion process in step S310.

(7b) The n$^{th}$ intermediate code indicating a conditional branch is deleted (step S310).

(8b) The n+2 intermediate code indicating an unconditional branch is deleted (step S311).

(9b) The n+1$^{th}$ intermediate code indicating a transfer is converted into a conditional transfer instruction specifying an exclusive condition for the condition specified by the n$^{th}$ intermediate code indicating a conditional branch (step S312).

(10b) The n+3$^{th}$ transfer code and the n+1$^{th}$ transfer code are interchanged.

(11b) N is incremented by 4 and the compiler judges whether there is any other intermediate code to be processed (steps S317 and S318). If so, the process in steps S302–318 is repeated. In this example, the intermediate code sequence including a conditional transfer instruction shown in FIG. 6B is generated.

(12b) In step S319, the intermediate code sequence shown in FIG. 6B is converted into the machine instruction sequence shown in FIG. 7B.

In this manner, the present compiler generates only conditional transfer instructions which the present processor can execute.

Embodiment 2

Figure 8:
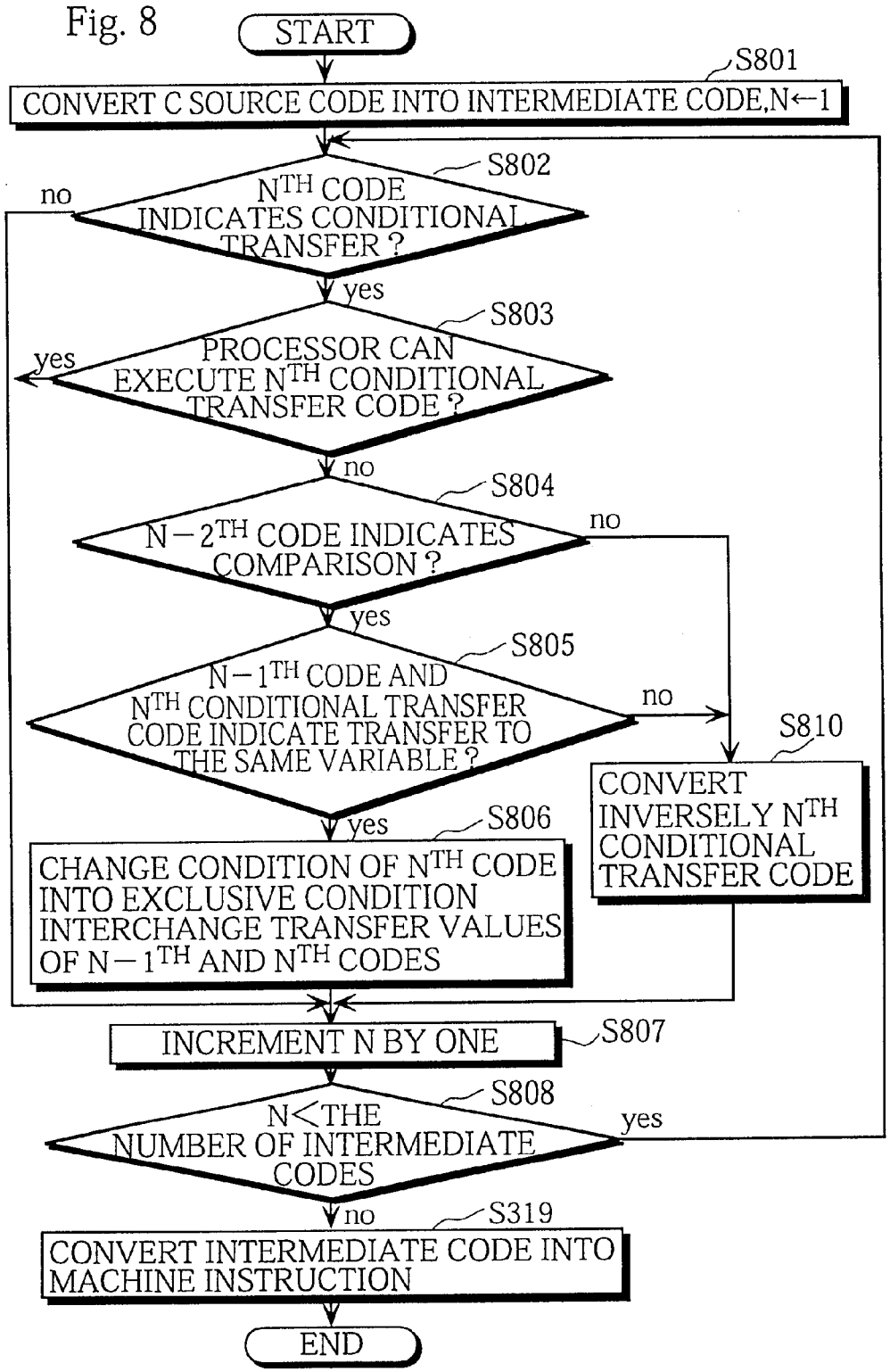
FIG. 8 is a flowchart showing the operation of the compiler of Embodiment 2.

FIG. 8 is a flowchart showing the operation of the compiler of the present embodiment.

FIG. 9 shows an intermediate code sequence including a conditional transfer instruction. This intermediate code sequence is generated by the present compiler from the C source program shown in FIG. 4B in step S801 of the flowchart shown in FIG. 8. Note that FIG. 9 shows the same intermediate code sequence as that generated by a conventional compiler for generating conditional transfer instruction during the conversion of the C source program shown in FIG. 4B into machine instructions.

In FIG. 9, the intermediate code 901 is a code for comparing the variables "a" and "b" and setting a flag to indicate the comparison result; the intermediate code 902 is a code for transferring the immediate "0" to the variable "c"; the intermediate code 903 is a code for transferring the immediate "1" to the variable "c" when the variables "a" and "b" are not equal; and the intermediate code 904 is a code for calling the function "f".

Here, the processor of the present embodiment can execute the conditional transfer instructions shown in FIG. 2, as the processor of Embodiment 1.

The following description concerns the process in the case where the C source program shown in FIG. 4B is input into the present processor, with reference to figures such as FIG. 8.

It should be noted here that each step shown in FIG. 8 that has the same number as a step in FIG. 3 executes the same process as before.

(1) The input C source program is converted into an intermediate code sequence including a conditional transfer instruction, and the initial value "1" is assigned to the variable n (step S801). In this example, the C source program shown in FIG. 4B is converted into the intermediate code sequence shown in FIG. 9.

(2) The compiler judges whether the $n^{th}$ intermediate code indicates a conditional transfer (step S802). This process is repeated by incrementing n by one until the judgement result becomes "Yes" (in this repetition, the judgement result in step S802 is No, the process proceeds to step S807, and the judgement result in step S808 is Yes). In this example, the intermediate code 903 shown in FIG. 9 indicates a conditional transfer, so that the judgement result in step S802 becomes Yes when n is 3 and the process proceeds to the judgement in step S803.

(3) The compiler judges whether the present processor can execute the $n^{th}$ conditional transfer code (step S803). Here, the condition specified by the intermediate code 903 indicating a conditional transfer is that "a" and "b" are not equal. As shown in FIG. 2, the present processor cannot execute a conditional branch instruction specifying this condition. Therefore, the judgement result in this step is No and the process proceeds to the judgement in step S804.

(4) The compiler judges whether the n−2th intermediate code indicates a comparison (step S804). When the judgement result is No, the process proceeds to the inverse conversion process in step S810; when Yes, the process proceeds to the judgement in step S805. In this example, the intermediate code 901 shown in FIG. 9 indicates a comparison, so that when n−2 is 1, the judgement result in step S804 becomes Yes and the process proceeds to step S805.

(5) The compiler judges whether the n−1th intermediate code indicates a transfer to the same variable as the $n^{th}$ intermediate code indicating a conditional transfer (step S805). When the judgement result is No, the process proceeds to the deletion process of conditional transfer instructions in step S810; when Yes, the process proceeds to the conversion process in step S805. In this example, the intermediate code 902 shown in FIG. 9 indicates a transfer to the same variable as the intermediate code 903 indicating a conditional transfer. Therefore, when n−1 is 3, the judgement result in step S805 becomes Yes and the process proceeds to the conversion process in step S806.

(6) The condition of the nth intermediate code indicating a conditional transfer is changed to an exclusive condition and the transfer values of the n−1th and $n^{th}$ intermediate codes are interchanged (step S806). In this example, the condition specified by the intermediate code 903 indicating a conditional branch shown in FIG. 9, that is "a" and "b" are not equal (≠), is changed to an exclusive condition (equal=). That is, "c=:ne 1" is changed to "c=: eq 1".

(7) N is incremented by 1 and the compiler judges whether there is any other intermediate instruction to be processed (steps S807 and S808). If so, the process in steps S802–S808 is repeated. In this example, the intermediate code sequence including a conditional transfer instruction shown in FIG. 6B is generated.

(8) In step S319, the intermediate code sequence shown in FIG. 6B is converted into the machine instruction sequence shown in FIG. 7B.

(9) Each conditional transfer instruction which cannot be executed by the present processor and also cannot be converted in the conversion process in step S806 is inversely converted to an original intermediate code (step S810). In this example, this process is not performed.

As described above, the present compiler converts unexecutable conditional transfer instructions into executable conditional transfer instructions for the present processor.

Embodiment 3

The processor of the present embodiment decodes and executes only conditional branch instructions specifying one out of a pair of conditions in an exclusive relation, out of the six types of conditional branch instructions specifying the same conditions as those specified by the six types of conditional transfer instructions 3101 shown in FIG. 31.

FIG. 10 shows a list of example conditional branch instructions which the present processor can execute. This list includes three types of conditional branch instructions 1001. Each of the conditions 1002 is a sign indicating a condition specified by one conditional branch instruction. When two operation objects "a" and "b" are compared by a comparison instruction, the condition of the "beq" 1003 is that "a" and "b" are equal; that of the "bgt" 1004 is that "a" is greater than "b"; and that of the "bge" 1005 is that "a" is greater than or equal to "b". Each conditional branch instruction indicates a branch which is performed when its condition is satisfied. Note that in this embodiment, the present processor cannot execute other conditional instructions.

Figure 11:
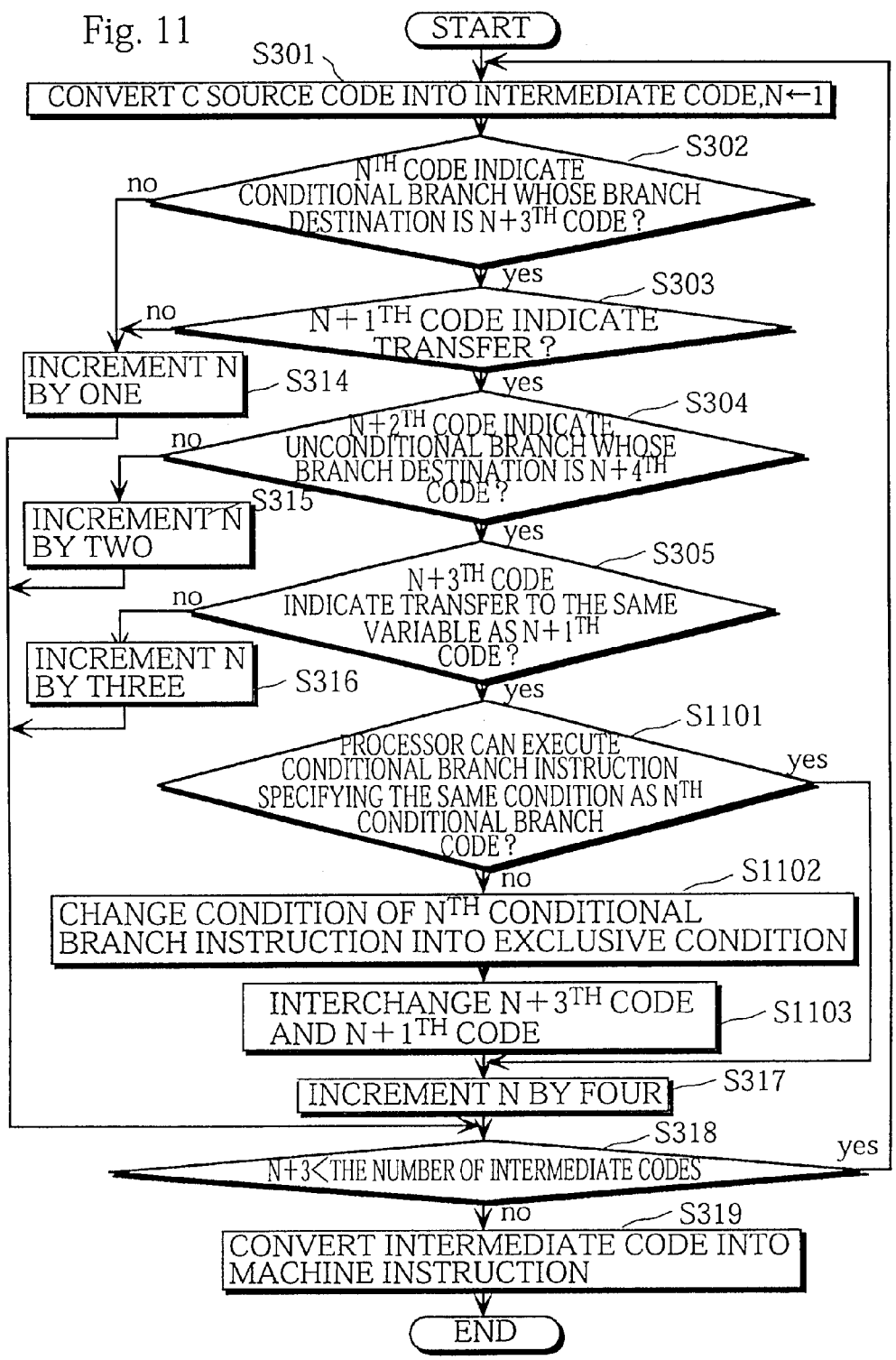
FIG. 11 is a flowchart showing the operation of the compiler of Embodiment 3.

FIG. 11 is a flowchart showing the operation of the compiler of Embodiment 3.

FIG. 12 shows an intermediate code sequence which the present processor can decode. This intermediate code sequence is generated by the present compiler from the intermediate code sequence shown in FIG. 5B, which the present processor cannot decode, in steps S302–318 of the flowchart shown in FIG. 11.

In FIG. 12, the intermediate code 1201 is a code for comparing the variables "a" and "b" and setting a flag to indicate the comparison result; the intermediate code 1202 is a code for branching to the label "Lt" 1207 when the variables "a" and "b" are equal; the intermediate code 1203 is a code for transferring the immediate "1" to the variable "c"; the intermediate code 1204 is a code for branching to the label "L" 1208; the intermediate code 1205 is a code for transferring the immediate "0" to the variable "c"; and the intermediate code 1206 is a code for calling the function "f".

FIG. 13 shows a machine instruction sequence. This machine instruction sequence is generated by the present compiler from the intermediate code sequence shown in FIG. 12 which the present processor can decode in step S319 of the flowchart shown in FIG. 11. Note that FIG. 13 shows the same machine instruction sequence as that generated by a conventional compiler from the intermediate code sequence shown in FIG. 12.

In FIG. 13, the machine instruction 1301 is an instruction for comparing values of the registers "r0" and "r1" and setting a flag to indicate the comparison result; the machine instruction 1302 is an instruction for branching to the label "Lt" 1307 when the values of the registers "r0" and "r1" are equal; the machine instruction 1303 is an instruction for transferring the immediate "1" to the register "r2"; the machine instruction 1304 is an instruction for branching to the label "L" 1308; the machine instruction 1305 is an instruction for transferring the immediate "0" to the register "r2"; and the machine instruction 1306 is an instruction for calling the function "f".

The following is a description of the processing of the present compiler to which the C source program shown in FIG. 4B is input, with reference to FIG. 11.

Note that each step shown in FIG. 11 that has the same number as a step in FIG. 13 executes the same processing as before.

(1) In step S301, the C source program shown in FIG. 4B is converted into the intermediate code sequence shown in FIG. 5B.

(2) The intermediate code 512 shown in FIG. 5B indicates a conditional branch whose branch destination is the n+3$^{th}$ intermediate code. Therefore, when n is 2, the judgement result in step S302 becomes Yes and the process proceeds to step S303.

(3) The intermediate code 513 shown in FIG. 5B indicates a transfer so that, when n+1 is 3, the judgement result in step S303 becomes Yes and the process proceeds to the judgement in step S304.

(4) The intermediate code 514 shown in FIG. 5B indicates an unconditional branch whose branch destination is the n+4$^{th}$ intermediate code. Therefore, when n+2 is 4, the judgement result in step S304 becomes Yes and the process proceeds to the judgement in step S304.

(5) The intermediate code 515 shown in FIG. 5B indicates a transfer to the same variable as intermediate code 513. Therefore, when n+3 is 5, the judgement result in step S305 becomes Yes and the process proceeds to step S306.

(6) The compiler judges whether the present processor can execute a conditional branch instruction of the same condition as that specified by the n$^{th}$ intermediate code indicating a conditional branch. When the judgement result is Yes, the conversion processing is not performed; when No, the process proceeds to the conversion processing (step S1101). In this example, the condition specified by the intermediate code 512 indicating a conditional branch shown in FIG. 5B is that "a" and "b" are not equal. As can be seen from FIG. 10, the present processor cannot execute a conditional branch instruction specifying this condition, so that the judgement result becomes No and the process proceeds to the conversion processing in step S1102.

(7) The condition specified by the n$^{th}$ intermediate code indicating a conditional branch is changed into an exclusive condition (step S1102). In this example, the condition specified by the intermediate code 512 indicating a conditional branch, that is "a" and "b" are not equal (≠), is changed into an exclusive condition, that is "a" and "b" are equal (=). More specifically, "bne" is changed into "beq".

(8) The n+3$^{th}$ transfer code and the n+1$^{th}$ transfer code are interchanged (step S1103). In this example, the fifth transfer code "c=0" and the third transfer code "c=1" are interchanged.

(9) In steps S317 and S318, the present compiler generates the executable intermediate code sequence shown in FIG. 12 for the present processor.

(10) In step S319, the present compiler converts the intermediate code sequence shown in FIG. 12 into the machine instruction sequence shown in FIG. 13.

As described above, the present compiler converts unexecutable conditional branch instructions into executable conditional branch instructions for the present processor.

Embodiment 4

FIG. 14 shows comparison instructions, a conditional addition instruction, a conditional transfer instruction, and a conditional branch instruction, where the number of types of instructions has been reduced. These instructions are used in the present embodiment.

In FIG. 14, each of the conditional instructions and the conditional branch instruction uses only one condition where a conditional flag is set. Therefore, FIG. 14 shows one type of conditional addition instruction, one type of conditional transfer instruction, one type of conditional branch instruction, and ten types of comparison instructions for setting and resetting the conditional flag.

Therefore, the total number of instructions including the comparison instructions, the conditional instructions for two operations, and the conditional branch instruction is thirteen. Here, if the number of types of operations of conditional instructions is assumed to be A, the total number of types of instructions including comparison instructions, conditional instructions for each operation, and the conditional branch instruction is represented as 11+A.

Here, each total number of types of instructions including comparison instructions, conditional addition instructions, conditional transfer instructions, and conditional branch instructions in FIGS. 14, 32, and 33 is compared. When the number of types of conditional instructions A is 0–3, the total number of instruction types shown in FIG. 33 is the lowest. When the number of types of conditional instructions A is 4, the total number of instruction types shown in FIGS. 14 and 33 is fifteen, which is the lowest (in this case, the total number of instruction types shown in FIG. 32 is 51). When the total number of types of conditional instructions A is 5 or more, the total number of instruction types shown in FIG. 14 is the lowest. As A increases, the difference between these figures widens.

The processor of the present embodiment decodes and executes the comparison instructions, the conditional addition instruction, the conditional transfer instruction, and the conditional branch instruction shown in FIG. 14.

Figure 15:
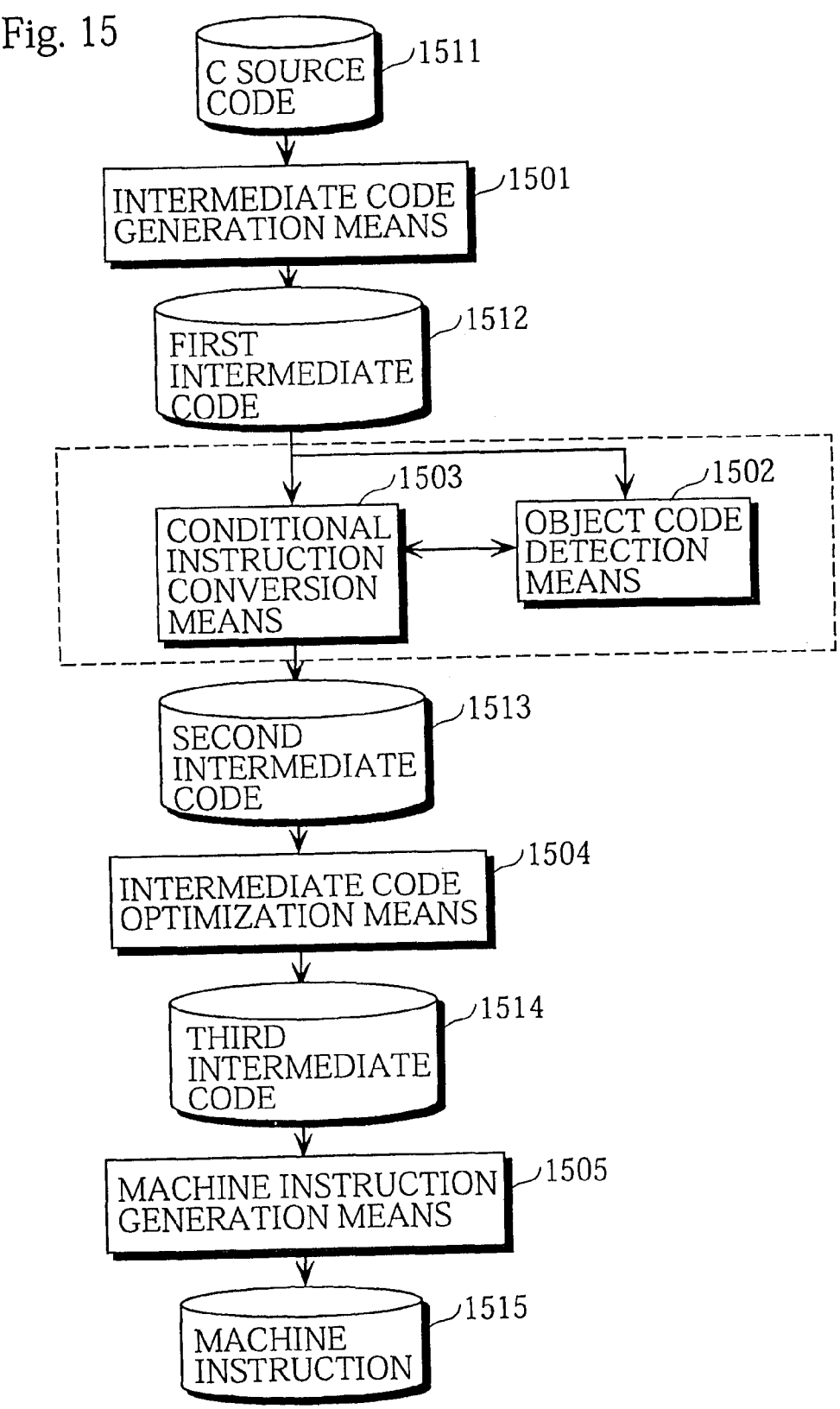
FIG. 15 shows the construction of the compiler of Embodiment 4.

FIG. 15 shows the construction of the present compiler.

The present compiler includes the intermediate code generation means 1501, the object code detection means 1502, the conditional instruction conversion means 1503, the intermediate code optimization means 1504, and the machine instruction generation means 1505.

FIG. 16 shows an example of the C source code 1511. This C source code is written in C language and is input into the present compiler. The C source program shown in FIG. 16 is the same as that shown in FIG. 4A and therefore is not described here.

The intermediate code generation means 1501 converts the C source code 1511 and generates the first intermediate code 1512. This conversion is the same as that performed by a conventional compiler and therefore is not described.

FIG. 17 shows the first intermediate code 1512. The first intermediate code 1512 shown in FIG. 17 is the same as that shown in FIG. 5A and therefore is not described here.

In this embodiment, the present compiler generates the first intermediate code 1512 shown in FIG. 17 from the C source code 1511 shown in FIG. 16.

The object code detection means 1502 detects instruction sequences whose predetermined operations are executed when their predetermined conditions are satisfied.

The conditional instruction conversion means 1503 converts a sequence of instructions detected by the object code detection means 1502 into conditional instructions and generates the second intermediate code 1513 from the first intermediate code 1512. The object code detection means 1502 and the conditional instruction conversion means 1503 are described in more detail later.

FIG. 18 shows the second intermediate code 1513.

In FIG. 18, the intermediate code "a cmpeq b" 1801 is a conditional comparison code for comparing the variables "a" and "b". When the variables are equal, an operation flag is set, and when the variables are not equal, the operation flag is reset. The intermediate code "c=0" 1802 is a code for transferring the immediate "0" to the variable "c". The intermediate code "c=:true 1" 1803 is a code which is executed when its condition is satisfied. With this intermediate code 1803, the immediate "1" is transferred to the variable "c", only when the condition included in the preceding comparison code is satisfied (when the operation flag is set). The intermediate code 1304 is a code for calling the function "f".

In this embodiment, the present compiler generates the second intermediate code 1513 shown in FIG. 18 from the first intermediate code 1512 shown in FIG. 17.

The intermediate code optimization means 1504 optimizes the second intermediate code 1513 and generates the intermediate code 1514. This optimization is the same as that performed by a conventional compiler and therefore is not described here.

In this embodiment, when receiving the second intermediate code 1513 shown in FIG. 18, the intermediate code optimization means 1504 does not perform the optimization processing. This is because the input second intermediate code does not include codes to be optimized. Therefore, the third intermediate code 1514 is the same as the second intermediate code 1513 shown in FIG. 18.

The machine instruction generation means 1505 converts the third intermediate code 1514 and generates the machine instruction 1515. This conversion is the same as that performed by a conventional compiler and therefore is not described here.

FIG. 19 shows the machine instruction 1515.

In FIG. 19, the machine instruction "cmpeq r0, r1" 1901 is a conditional comparison instruction for comparing values of the registers "r0" and "r1". When the values are equal, the operation flag is set; when the values are not equal, the operation flag is reset. The machine instruction "mov 0, r2" 1902 is a transfer instruction for transferring the immediate "0" to the register "r2". The machine instruction "movt 1, r2" 1903 is an instruction which is executed when its condition is satisfied. With this machine instruction 1903, only when the condition is satisfied by the result of a comparison instruction (when the operation flag is set), the immediate "1" is transferred to the register "r2". The machine instruction 1904 is an instruction for calling the function "f".

In this embodiment, the present compiler generates the machine instruction 1515 shown in FIG. 19 from the third intermediate code 1514 shown in FIG. 18.

Figure 20:
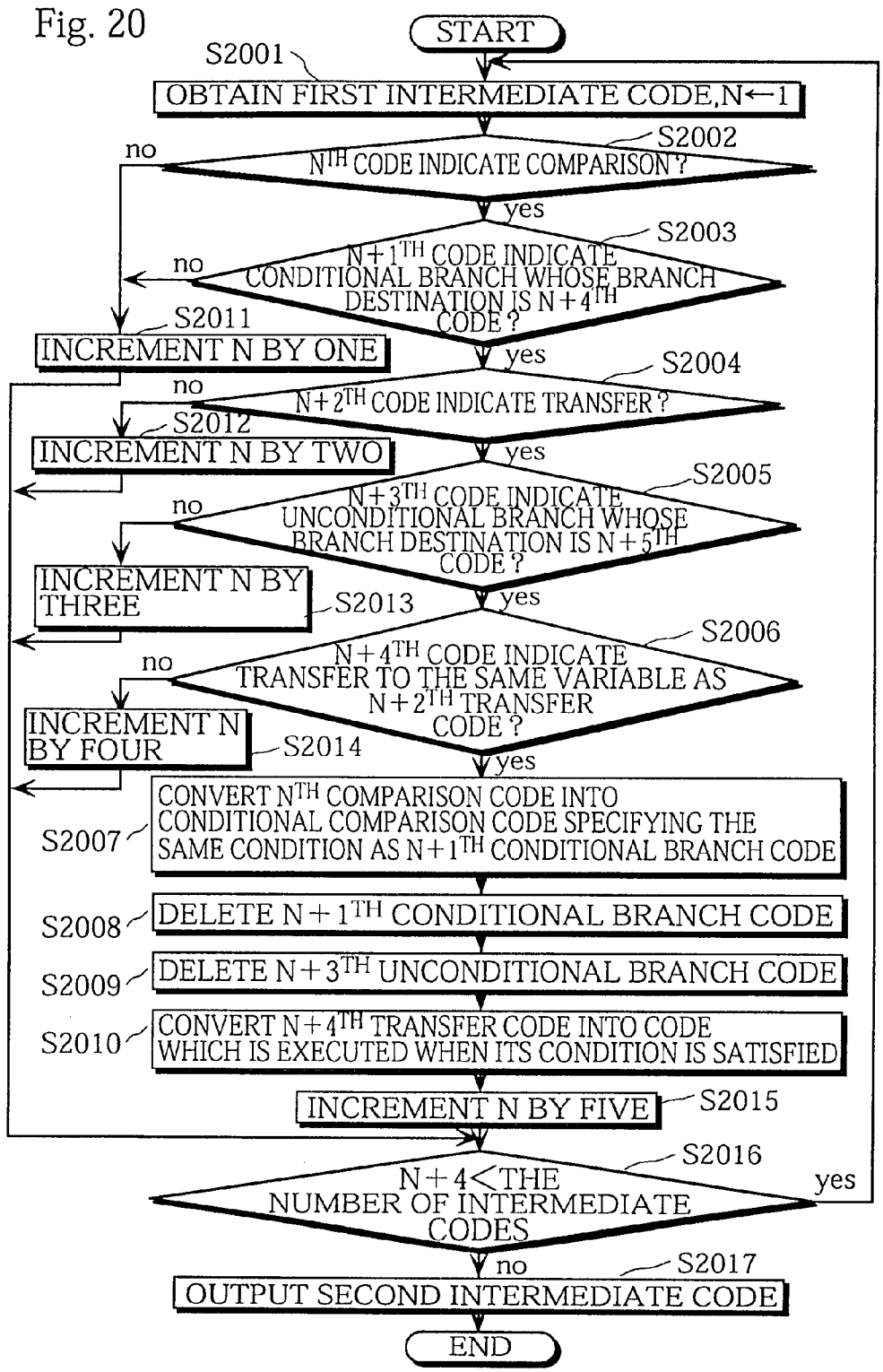
FIG. 20 is a flowchart showing the operation of the object code detection means 1502 and the conditional instruction conversion means 1503 of Embodiment 4.

FIG. 20 is a flowchart showing the operation of the object code detection means 1502 and the conditional instruction conversion means 1503 of the present compiler.

The following is a description of the object code detection means 1502 and the conditional instruction conversion means 1503 of the present compiler to which the first intermediate code 1512 shown in FIG. 17 is input, with reference to FIG. 17.

(1) The first intermediate code is input into the object code detection means 1502 and the conditional instruction conversion means 1503, and the initial value "1" is assigned to the variable n (step S2001). In this example, the first intermediate code shown in FIG. 17 is obtained.

(2) The compiler judges whether the $n^{th}$ intermediate code indicates a comparison (step S2002). This process is repeated by incrementing n by one until the judgement result becomes "Yes" (in this repetition, the judgement result in step S2002 is No, the process proceeds to step S2011, and the judgement result in step S2016 is Yes). In this example, the 1st intermediate code of the first intermediate code indicates a comparison so that, when n is 1, the judgement result in step S2002 becomes Yes and the process proceeds to the judgement in step S2003.

(3) The compiler judges whether the $n+1^{th}$ intermediate code indicates a conditional branch and whether its branch destination is the $n+4^{th}$ intermediate code (step S2003). When the judgement result is No, n is incremented by one and the process returns to step S2002 to find an intermediate code indicating a comparison (in this case, the judgement result in step S2003 is No, the process proceeds to steps S2011, and the judgement result in S2016 is Yes). In this example, the 2nd intermediate code shown in FIG. 17 indicates a conditional branch whose branch destination is the $n+4^{th}$ intermediate code. Therefore, when n+1 is 2, the judgement result in step S2003 becomes Yes and the process proceeds to the judgement in step S2004.

(4) The compiler judges whether the $n+2^{th}$ intermediate code indicates a transfer (step S2004). When the judgement result is No, n is incremented by 2 and the process returns to step S2002 to find an intermediate code indicating a comparison (in this case, the judgement result in step S2004 is No, the process proceeds to step S2012, and the judgement result in step S2016 is Yes). In this example, the 3rd intermediate code shown in FIG. 17 indicates a transfer, so that when n+2 is 3, the judgement result in step S2004 becomes Yes and the process proceeds to the judgement in step S2005.

(5) The compiler judges whether the n+3$^{th}$ intermediate code indicates an unconditional branch whose branch destination is the n+5$^{th}$ intermediate code (step S2005). When the judgement result is No, n is incremented by 3 and the process returns to step S2002 to find an intermediate code indicating a comparison (in this case, the judgement result in step S2405 is No, the process proceeds to step S2013, and the judgement result in step S2016 is Yes). In this example, the 4th intermediate code shown in FIG. 17 indicates an unconditional branch whose branch destination is the n+5th intermediate code. Therefore, when n+3 is 4, the judgement result in step S2005 becomes Yes and the process proceeds to the judgement in step S2006.

(6) The compiler judges whether the n+4$^{th}$ intermediate code indicates a transfer to the same variable of the n+2$^{th}$ intermediate code (step S2006). When the judgement result is No, n is increased by 4 and the process returns to step S2002 to find an intermediate code indicating a comparison (in this case, the judgement result in step S2006 is No, the process proceeds to step S2014, and the judgement result in step S2016 is Yes). In this example, the 5th intermediate code indicates a transfer to the same variable as the 3rd intermediate code, so that when n+4 is 5, the judgement result in step S2005 becomes Yes and the process proceeds to the conversion process in step S2006.

(7) The n$^{th}$ intermediate code indicating a comparison is changed into a conditional comparison code specifying the same condition as the n+1 intermediate code indicating a conditional branch (step S2007).

(8) The n+1 intermediate code indicating a conditional branch is deleted (step S2008).

(9) The n+3$^{th}$ intermediate code indicating an unconditional branch is deleted (step S2009).

(10) The n+4$^{th}$ intermediate code indicating a transfer is changed into a code which is executed when its condition is satisfied (step S2010).

(11) N is increased by 5 and the compiler judges whether there is any other intermediate code to be processed (steps S2015 and S2016). If so, the process in steps S2002–S2016 is repeated. In this example, the second intermediate code sequence 1513 shown in FIG. 18 is generated.

(12) The conditional instruction conversion means 1503 outputs the second intermediate code (step S2017).

In this manner, the present compiler generates conditional comparison codes and codes which are executed when their conditions are satisfied. The present processor can execute these codes.

Embodiment 5

The processor of Embodiment 5 decodes and executes the comparison instructions, the conditional addition instruction, the conditional transfer instruction, and the conditional branch instruction shown in FIG. 14, as the processor of Embodiment 4.

The present processor includes the same components as the processor of Embodiment 4 shown in FIG. 15.

The following description concerns only the differences between the present embodiment and Embodiment 4.

Figure 21:
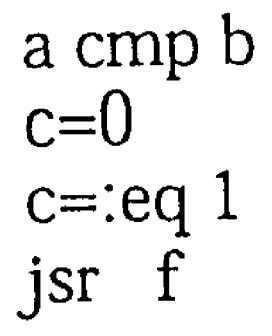

FIG. 21 shows the first intermediate code 1512. The first intermediate code 1512 shown in FIG. 21 is the same as that shown in FIG. 6A and therefore is not described here.

The intermediate code generation means 1501 generates the first intermediate code 1512 shown in FIG. 21 from the C source code 1511 shown in FIG. 16. This conversion is the same as that performed by a conventional compiler for generating conditional transfer instructions and therefore is not described here.

The object code detection means 1502 and the conditional instruction conversion means 1503 generate the second intermediate code 1513 shown in FIG. 18 from the first intermediate code 1512 shown in FIG. 21.

Figure 22:
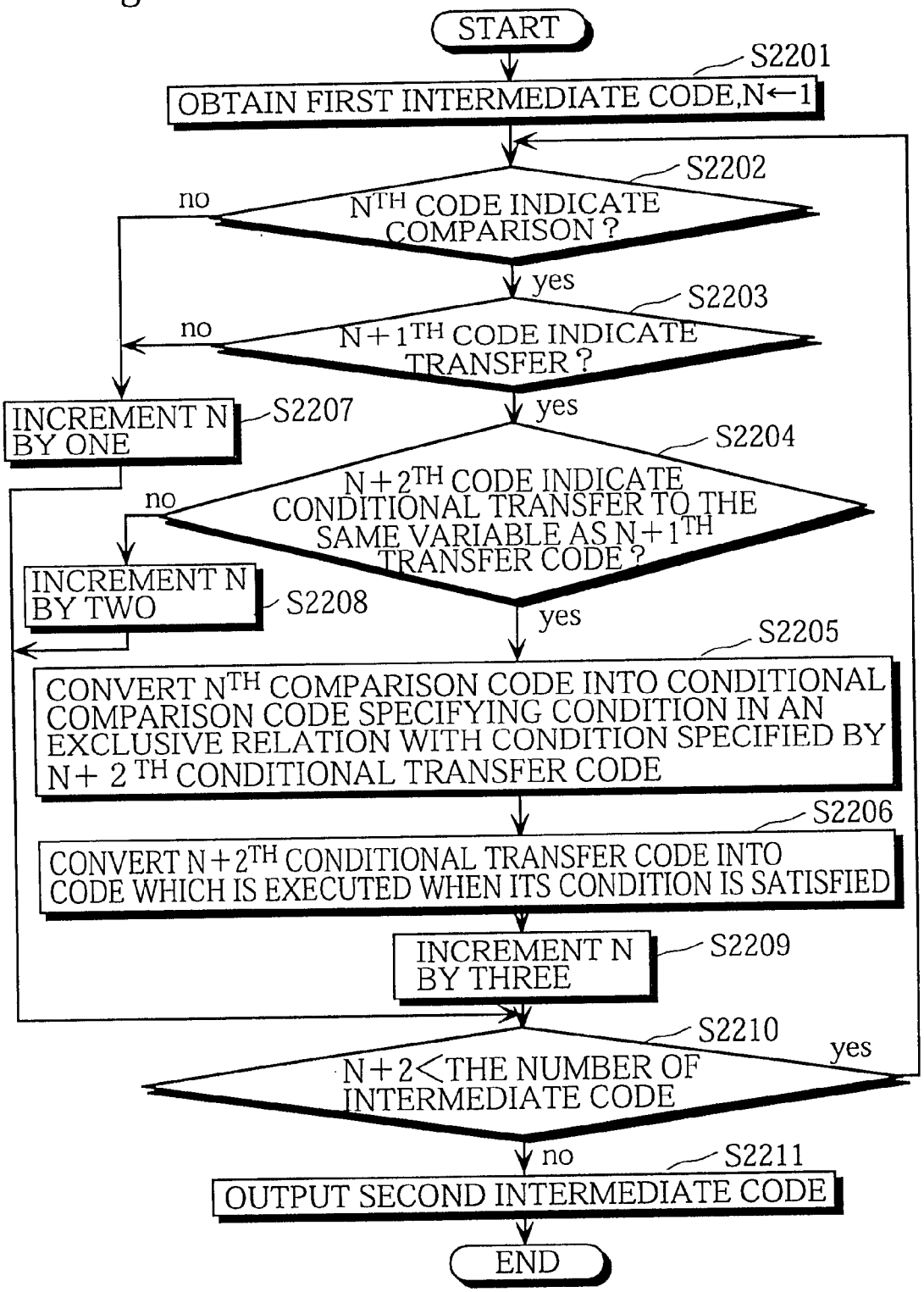
FIG. 22 is a flowchart showing the operation of the object code detection means 1502 and the conditional instruction conversion means 1503 of Embodiment 5.

FIG. 22 is a flowchart showing the operation of the object code detection means 1502 and the conditional instruction conversion means 1503 of the present embodiment.

The following is a description of the processing of the object code detection means 1502 and the conditional instruction conversion means 1503 of the present compiler to which the first intermediate code 1512 shown in FIG. 21 is input, with reference to FIG. 21.

(1) The first intermediate code is input into the object code detection means 1502 and the conditional instruction conversion means 1503, and the initial value "1" is assigned to the variable n (step S2201). In this example, the first intermediate code shown in FIG. 21 is obtained.

(2) The compiler judges whether the n$^{th}$ intermediate code of the first intermediate code indicates a comparison (step S2202). This process is repeated by incrementing n by one until the judgement result becomes "Yes" (in this repetition, the judgement result in step S2202 is No, the process proceeds to steps S2207, and the judgement result in S2210 is Yes). In this example, the 1st intermediate code of the first intermediate code indicates a comparison, so that when n is 1, the judgement result in step S2202 becomes Yes and the process proceeds to the judgement in step S2203.

(3) The compiler judges whether the n+1$^{th}$ intermediate code indicates a transfer (step S2203). When the judgement result is No, n is incremented by one and the process returns to step S2202 to find an intermediate code indicating a comparison (in this case, the judgement result in step S2203 is No, the process proceeds to step S2207, and the judgement result in S2210 is Yes). In this example, the 2nd intermediate code shown in FIG. 21 indicates a transfer, so that when n+1 is 2, the judgement result in step S2203 becomes Yes and the process proceeds to the judgement in step S2204.

(4) The compiler judges whether the n+2$^{th}$ intermediate code indicates a conditional transfer to the same variable as the n+1$^{th}$ intermediate code (step S2204). When the judgement result is No, n is incremented by 2 and the process returns to step S2202 to find an intermediate code indicating a comparison (in this case, the judgement result in step S2204 is No, the process proceeds to step S2208, and the judgement result in S2210 is Yes). In this example, the 3rd intermediate code shown in FIG. 21 indicates the conditional transfer to the same variable as the 2nd intermediate code. Therefore, when n+2 is 3, the judgement result in step S2204 becomes Yes and the process proceeds to the conversion process in step S2205.

(5) The n$^{th}$ intermediate code indicating a comparison is converted into a conditional comparison code specifying a condition in the exclusive relation with that specified by the n+2$^{th}$ conditional transfer (step S2205).

(6) The n+2$^{th}$ intermediate code indicating a conditional transfer is converted into a code which is executed when its condition is satisfied (step S2206).

(7) N is incremented by 3 and the compiler judges whether there is any other intermediate code to be processed (steps S2209 and S2210). If so, the process in steps S2202–S2210 is repeated. In this example, the second intermediate code 1513 shown in FIG. 18 is generated.

(8) The conditional instruction conversion means 1503 outputs the second intermediate code (step S2211).

In this manner, the present compiler generates executable conditional comparison codes and codes which are executed when their conditions are satisfied for the present processor.

Embodiment 6

The processor of Embodiment 6 decodes and executes the comparison instructions, the conditional addition instruction, the conditional transfer instruction, and the conditional branch instruction shown in FIG. 14, as the processors of Embodiments 4 and 5.

The compiler of Embodiment 6 includes the same components as those of the processor of Embodiment 4 or Embodiment 5 shown in FIG. 15.

The following description concerns only the difference between the present embodiment and Embodiment 4.

Figure 23:
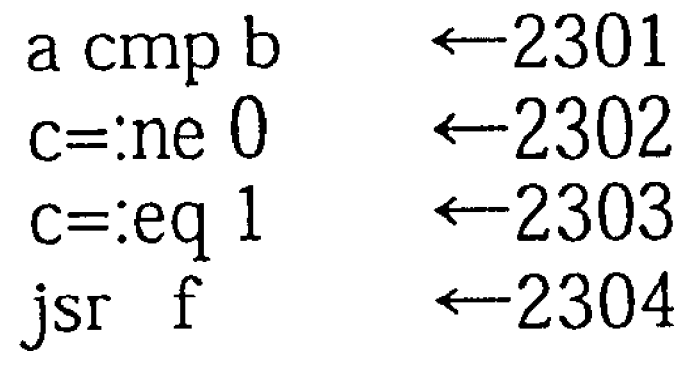

FIG. 23 shows the first intermediate code 1512.

In FIG. 23, the intermediate code 2301 is a code for comparing the variables "a" and "b" and setting a flag to indicate the comparison result; the intermediate code 2302 is a code for transferring the immediate "0" to the variable "c" when the variables "a" and "b" are not equal; the intermediate code 2303 is a code for transferring the immediate "1" to the variable "c" when the variables "a" and "b" are equal; and the intermediate code 2304 is a code for calling the function "f".

The intermediate code generation means 1501 generates the first intermediate code 1512 shown in FIG. 23 from the C source code 1511 shown in FIG. 16. This conversion is the same as that performed by a conventional compiler for generating conditional transfer instructions and therefore is not described here.

The object code detection means 1502 and the conditional instruction conversion means 1503 generate the second intermediate code 1513 shown in FIG. 18 from the first intermediate code 1512 shown in FIG. 23.

Figure 24:
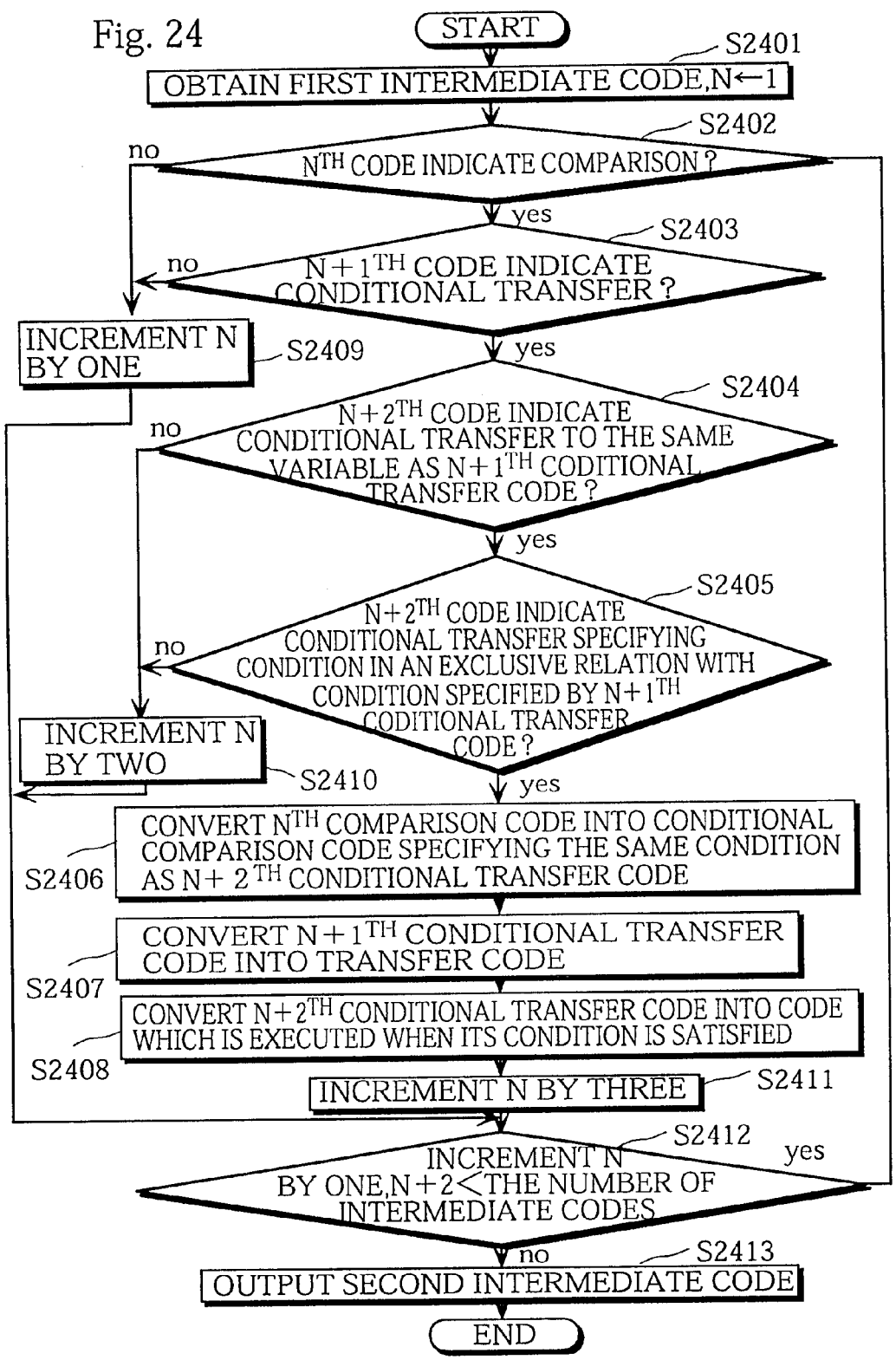
FIG. 24 is a flowchart showing the operation of the object code detection means 1502 and the conditional instruction conversion means 1503 of Embodiment 6.

FIG. 24 is a flowchart showing the operation of the object code detection means 1502 and the conditional instruction conversion means 1503 of the present processor.

The following is a description of the processing of the intermediate code 1512 shown in FIG. 23 by the object code detection means 1502 and the conditional instruction conversion means 1503 of the present compiler.

(1) The first intermediate code is input into the object code detection means 1502 and the conditional instruction conversion means 1503, and the initial value "1" is assigned to the variable n (step S2401). In this example, the first intermediate code shown in FIG. 23 is obtained.

(2) The compiler judges whether the n$^{th}$ intermediate code of the first intermediate code indicates a comparison (step S2402). This process is repeated by incrementing n by one until the judgement result becomes Yes (in this repetition, the judgement result in step S2402 is No, the process proceeds to step S2409, and the judgement result in S2412 is Yes). In this example, the 1st intermediate code of the first intermediate code indicates a comparison, so that when n is 1, the judgement result in step S2402 becomes Yes and the process proceeds to the judgement in step S2403.

(3) The compiler judges whether the n+1$^{th}$ intermediate code indicates a conditional transfer (step S2403). When the judgement result is No, n is incremented by one and the process returns to step S2402 to find an intermediate code indicating a comparison (in this case, the judgement result in step S2403 is No, the process proceeds to step S2409, and the judgement result in S2412 is Yes). In this example, the 2nd intermediate code shown in FIG. 23 indicates a conditional transfer, so that, when n+1 is 2, the judgement result in step S2403 becomes Yes and the process proceeds to the judgement in step S2404.

(4) The compiler judges whether the n+2$^{th}$ intermediate code indicates a conditional transfer to the same variable as the n+1$^{th}$ intermediate code (step S2404). When the judgement result is No, n is incremented by 2 and the process returns to step S2402 to find an intermediate code indicating a comparison (in this case, the judgement result in step S2404 is No, the process proceeds to step S2410, and the judgement result in step S2412 is Yes). In this example, the 3rd intermediate code shown in FIG. 23 indicates a conditional transfer to the same variable as the 2nd intermediate code. Therefore, when n+2 is 3, the judgement result in step S2404 becomes Yes and the process proceeds to the conversion process in step S2405.

(5) The compiler judges whether the condition of the n+2$^{th}$ intermediate code indicating a conditional transfer is in an exclusive relation with the condition of the n+1$^{th}$ intermediate code indicating a conditional transfer (step S2405). When the judgement result is No, n is incremented by 2 and the process returns to step S2402 to find an intermediate code indicating a comparison (in this case, the judgement result in step S2405 is No, the process proceeds to step S2410, and the judgement result in step S2412 is Yes). In this example, the condition of the 3rd intermediate code indicating a conditional transfer is in the exclusive relation with the condition of the 2nd intermediate code indicating a conditional transfer. Therefore, when n+2 is 3, the judgement result in step S2405 becomes Yes and the process proceeds to step S2406.

(6) The n$^{th}$ intermediate code indicating a comparison is converted into a conditional comparison code specifying the same condition as the n+2$^{th}$ intermediate code indicating a conditional transfer (step S2406).

(7) The n+1$^{th}$ intermediate code indicating a conditional transfer is converted into a transfer code (step S2407).

(8) The n+2$^{th}$ intermediate code indicating a conditional transfer is converted into a code which is executed when its condition is satisfied (step S2408).

(9) N is incremented by 3 and the compiler judges whether there is any other intermediate code to be processed (steps S2411 and S2412). If so, the process in steps S2402–S2412 is repeated. In this example, the second intermediate code 1513 shown in FIG. 18 is generated.

In this manner, the present compiler generates conditional comparison codes and codes which are executed when their conditions are satisfied. The present processor can execute these generated codes.

The processor and compiler of the present invention has been described above by means of the embodiments, although it should be obvious that the present invention is not limited to the examples described above. Further variations are described below.

(1) The compiler of the present invention converts immediate code not including conditional transfer code and intermediate code including conditional transfer code which the processor of the present invention cannot execute into intermediate code including conditional transfer code which the processor of the present invention can execute. However, the compiler of the present invention may convert a machine instruction sequence not including conditional transfer instructions and a machine instruction sequence including conditional transfer instructions which the processor of the present invention cannot execute into a machine instruction sequence including conditional transfer instructions which the processor of the present invention can execute.

(2) In the above embodiments, immediates are transferred by transfer instructions. However, the contents of registers or memory may be transferred.

(3) In the above embodiments, transfer instructions are converted into conditional instructions and instructions which are executed when their conditions are satisfied. However, arithmetic logical instructions may be converted into these instructions. For instance, Embodiment 1 may be applied to addition instructions and an instruction sequence including conditional addition instructions may be generated.

FIG. 25 shows a list of conditional addition instructions which the processor of Embodiment 1 can execute. This list includes three types of conditional addition instructions, which is to say, the conditional addition instructions 2501. The conditions 2502 are signs indicating conditions specified by respective conditional addition instructions. When two operation objects "a" and "b" are compared by a comparison instruction, the condition of the "addeq" 2503 is that "a" and "b" are equal; the condition of the "addgt" 2504 is that "a" is greater than "b"; and the condition of the "addge" 2505 is that "a" is greater than or equal to "b". Each conditional addition instruction is executed when its condition is satisfied.

FIG. 26 shows an example C source program written in C language.

FIG. 27 shows an intermediate code sequence not including conditional addition instructions generated from the C source program shown in FIG. 26.

FIG. 28 shows an intermediate code sequence including a conditional addition instruction generated from the intermediate code sequence shown in FIG. 27.

FIG. 29 shows a machine instruction sequence generated from the intermediate code sequence shown in FIG. 28.

The compiler of this variation converts the program shown in FIG. 26 into the intermediate code shown in FIG. 27, into the intermediate code shown in FIG. 28, and into the instruction sequence including a conditional addition instruction shown in FIG. 29.

(4) In Embodiments 4–6, the conditions of conditional instructions and conditional branch instruction are that the conditional flag is set. However, the conditions may be that the conditional flag is reset.

What is claimed is:

1. A processor which decodes and executes an instruction sequence, the processor comprising:
a state hold means for holding, when a predetermined instruction is executed, a renewal state for an execution result of the predetermined instruction;
an obtaining means for obtaining an instruction sequence composed of instructions matching instructions assigned to an instruction set of the processor,
wherein the instruction set is assigned first conditional instructions, a first state condition for a first conditional instruction being mutually exclusive with a second state condition for a second conditional instruction which has a same operation code as the first conditional instruction, the instruction set not being assigned the second conditional instruction, and the first state condition and the second state condition specifying either of one state and a plurality of states;
a decoding means for decoding each instruction in the obtained instruction sequence one by one;
a judging means for judging whether the renewal state is included in either of the state and the plurality of states specified by the first state condition in the first conditional instruction, when the decoding means decodes the first conditional instruction; and
an execution means for executing, only if a judgement result by the judging means is affirmative, an operation specified by the operation code in the first conditional instruction decoded by the decoding means.

2. The processor of claim 1,
wherein the renewal state shows a relation between magnitudes of two comparison objects a and b, the relation corresponding to an execution result of a type of comparison instruction,
wherein execution of a first conditional instruction is only possible after a comparison instruction, and the instruction set is assigned three types of first conditional instructions, the first condition states of the three types of first conditional instructions being:
1. one out of "a=b" and "a≠b";
2. one out of "a≧b" and "a<b"; and
3. one out of "a≦b" and "a>b".

3. The processor of claim 2,
wherein an operation code included in a conditional instruction is one of a transfer operation code, an arithmetic operation code, and a logic operation code.

4. A processor which decodes and executes an instruction sequence, the processor including:
an obtaining means for obtaining an instruction sequence composed of instructions matching instructions assigned to an instruction set of the processor,
wherein the instruction set is assigned at least one first conditional flag setting instruction, at least one second conditional flag setting instruction, and at least one conditional execution instruction,
each first conditional flag setting instruction including a first condition, and each second conditional flag setting instruction including a second condition, each first condition being mutually exclusive with one of the second conditions,
each conditional execution instruction including an operation code that is not included in any other conditional execution instruction in the instruction set;
a decoding means for decoding each instruction in the obtained instruction sequence one by one;
a conditional flag for holding a judgement result as to whether a predetermined condition is satisfied;
a judging means for judging, when the decoding means decodes the first conditional flag setting instruction, whether the first condition in the first conditional flag setting instruction is satisfied and has the conditional flag hold a judgement result for the first condition and, when the decoding means decodes the second conditional flag setting instruction, judges whether the second condition in the second conditional flag setting instruction is satisfied and has the conditional flag hold a judgement result for the second condition; and an execution means for executing, only if the decoding means decodes the conditional execution instruction and the judgement result held by the conditional flag indicates that a condition for the conditional execution instruction is satisfied, an operation specified by the operation code in the conditional execution instruction.

5. The processor of claim 4, wherein each of the first conditional flag setting instruction and the second conditional flag setting instruction specifies two comparison objects a and b, wherein the instruction set is assigned three types of first conditional flag setting instructions and three types of second conditional flag setting instructions, the first conditions of the first conditional flag setting instructions being a combination of the following conditions:
1. one out of "a=b" and "a≠b";
2. one out of "a≧b" and "a<b"; and
3. one out of "a≦b" and "a>b", the second conditions of the second conditional instructions being three mutually exclusive conditions for the three first conditions.

6. The processor of claim 5, wherein the instruction set is further assigned two types of first conditional flag setting instructions and two types of second conditional flag setting instructions, the first conditions of the first conditional flag setting instructions being a combination of the following conditions:
4. one out of "a≧b" and "a<b"; and
5. one out of "a≦b" and "a>b"

(where a and b of conditions 4 and 5 are compared with signs of a and b being taken into account), and the second conditions of the second conditional flag setting instructions being mutually exclusive with the first conditions.

7. The processor of claim 5, wherein an operation code included in a conditional execution instruction is one of a transfer operation code, an arithmetic operation code, a logic operation code, and a branch operation code.

8. A processor which decodes and executes an instruction sequence, the processor comprising:

a state hold unit for holding, when a predetermined instruction is executed, a renewal state for an execution result of the predetermined instruction;

an obtaining unit for obtaining an instruction sequence composed of instructions matching instructions assigned to an instruction set of the processor, wherein the instruction set is assigned first conditional instructions, a first state condition for a first conditional instruction being mutually exclusive with a second state condition for a second conditional instruction which has a same operation code as the first conditional instruction, the instruction set not being assigned the second conditional instruction, and the first state condition and the second stake condition specifying either of one state and a plurality of states;

a decoding unit for decoding each instruction in the obtained instruction sequence one by one;

a judging unit for judging whether the renewal state is included in either of the state and the plurality of states specified by the first state condition in the first conditional instruction, when the decoding unit decodes the first conditional instruction; and an execution unit for executing an operation specified by the operation code in the second conditional instruction, and subsequently, only if a judgment result by the judging unit is affirmative, an operation specified by the operation code in the first conditional instruction decoded by the decoding unit.

9. The processor of claim 8, wherein the renewal state shows a relation between magnitudes of two comparison objects a and b, the relation corresponding to an execution result of a type of comparison instruction, wherein the execution unit performs an execution of a first conditional instruction only after a comparison instruction, and the instruction set is assigned three types of first conditional instructions, the first condition stakes of the three types of first conditional instructions being:
1. one out of "a=b" and "a≠b";
2. one out of "a≧b" and "a<b"; and
3. one out of "a≦b" and "a>b".

10. The processor of claim 9, wherein an operation code included in a conditional instruction is one of a transfer operation code, an arithmetic operation code, and a logic operation code.

11. A processor which decodes and executes an instruction sequence, the processor including:

an obtaining unit for obtaining an instruction sequence composed of instructions matching instructions assigned to an instruction set of the processor, wherein the instruction set is assigned at least one first conditional flag setting instruction, at least one second conditional flag setting instruction, and at least one conditional execution instruction, each first conditional flag setting instruction including a first condition, and each second conditional flag setting instruction including a second condition, each first condition being mutually exclusive with one of the second conditions, each conditional execution instruction including an operation code that is not included in any other conditional execution instruction in the instruction set;

a decoding unit for decoding each instruction in the obtained instruction sequence one by one;

a conditional flag for holding a judgment result as to whether a predetermined condition is satisfied;

a judging unit for judging, when the decoding unit decodes the first conditional flag setting instruction, whether the first condition in the first conditional flag setting instruction is satisfied and has the conditional flag hold a judgment result for the first condition and, when the decoding unit decodes the second conditional flag setting instruction, judges whether the second condition in the second conditional flag setting instruction is satisfied and has the conditional flag hold a judgment result for the second condition; and an execution unit for executing an operation specified by an operation code that is not included in any conditional execution instruction in the instruction set, and subsequently, only if the decoding unit decodes the conditional execution instruction and the judgment result held by the conditional flag indicates that a condition for the conditional execution instruction is satisfied, an operation specified by the operation code in the conditional execution instruction.

12. The processor of claim 11, wherein each of the first conditional flag setting instruction and the second conditional flag setting instruction specifies two comparison objects a and b, wherein the instruction set is assigned three types of first conditional flag setting instructions and three types of second conditional flag setting instructions, the first conditions of the first conditional flag setting instructions being a combination of the following conditions:
1. one out of "a=b" and "a≠b";
2. one out of "a≧b" and "a<b"; and
3. one out of "a≦b" and "a>b", the second conditions of the second conditional instructions being three mutually exclusive conditions for the three first conditions.

13. The processor of claim 12, wherein the instruction set is further assigned two types of first conditional flag setting instructions and two types of second conditional flag setting instructions, the first conditions of the first conditional flag setting instructions being a combination of the following conditions:
4. one out of "a≧b" and "a<b"; and
5. one out of "a≦b" and "a>b"

(where a and b of conditions 4 and 5 are compared with signs of a and b being taken into account), and the second conditions of the second conditional flag setting instructions being mutually exclusive with the first conditions.

14. The processor of claim 12, wherein an operation code included in a conditional execution instruction is one of a transfer operation code, an arithmetic operation code, a logic operation code, and a branch operation code.

* * * * *